US010939491B2

(12) United States Patent
El Khayat et al.

(10) Patent No.: US 10,939,491 B2
(45) Date of Patent: Mar. 2, 2021

(54) MAINTAINING USER PLANE SESSION AND RESTORING CONTROL PLANE SESSION IN CASE OF CONTROL PLANE MODULE FAILURE OF GATEWAY FOR MULTICAST TRANSMISSIONS

(71) Applicant: Telefonaktiebolaget LM Ericsson (publ), Stockholm (SE)

(72) Inventors: Ibtissam El Khayat, Glons (BE); Jie Ling, Shanghai (CN); Qi Xia, Shanghai (CN); Tingyu Zhang, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 569 days.

(21) Appl. No.: 15/517,334

(22) PCT Filed: Oct. 24, 2014

(86) PCT No.: PCT/EP2014/072865
§ 371 (c)(1),
(2) Date: Apr. 6, 2017

(87) PCT Pub. No.: WO2016/062354
PCT Pub. Date: Apr. 28, 2016

(65) Prior Publication Data
US 2018/0242387 A1    Aug. 23, 2018

(51) Int. Cl.
*H04W 76/19*    (2018.01)
*H04W 76/12*    (2018.01)
(Continued)

(52) U.S. Cl.
CPC ........... *H04W 76/19* (2018.02); *H04W 76/12* (2018.02); *H04W 76/40* (2018.02); *H04W 88/16* (2013.01)

(58) Field of Classification Search
CPC ..... H04W 76/19; H04W 76/12; H04W 76/40; H04W 88/16
(Continued)

(56) References Cited

U.S. PATENT DOCUMENTS

| 7,787,360 B2* | 8/2010 | Windisch | ................ H04L 45/00 370/217 |
| 2007/0053359 A1* | 3/2007 | Wu | ........................... H04J 3/14 370/392 |

(Continued)

FOREIGN PATENT DOCUMENTS

WO    2011022613 A1    2/2011

OTHER PUBLICATIONS

3rd Generation Partnership Project, "Technical Specification Group Core Network and Terminals; Restoration procedures (Release 12)" 3GPP TS 23.007 V12.5.0, Jun. 2014, pp. 1-90.
(Continued)

*Primary Examiner* — Chi Tang P Cheng
(74) *Attorney, Agent, or Firm* — Patent Portfolio Builders, PLLC

(57) ABSTRACT

For managing multicast transmissions in a cellular network, a control plane module (162) of a gateway node (160) of the cellular network establishes one or more control plane sessions associated with the multicast transmissions. Further, a user plane module (164) of the gateway node (160) establishes one or more user plane sessions associated with the multicast transmissions. The control plane module (162) of the gateway node (160) indicates context information of the control plane session(s) to an external storage (175). During a failure of the control plane module (162) of the gateway node (160), the user plane module (164) of the gateway node (160) maintains the user plane session(s). After recovery from the failure of the control plane module (162) of the gateway node (160), the control plane module (162) of the gateway node receives the context information from the external storage (175) and re-establishes at least one of the more control plane session(s) on the basis of the received context information.

44 Claims, 14 Drawing Sheets

(51) Int. Cl.
*H04W 76/40* (2018.01)
*H04W 88/16* (2009.01)
(58) Field of Classification Search
USPC .......................................................... 370/312
See application file for complete search history.

(56) References Cited

U.S. PATENT DOCUMENTS

| | | | |
|---|---|---|---|
| 2007/0191033 A1* | 8/2007 | Marais | H04L 67/14 455/466 |
| 2014/0101305 A1* | 4/2014 | Kelley, Jr. | H04L 45/24 709/224 |
| 2016/0014572 A1* | 1/2016 | Vetter | H04L 69/167 370/312 |

OTHER PUBLICATIONS

RD Generation Partnership Project, "Technical Specification Group Core Network and Terminals; Interworking between the Public Land Mobile Network (PLMN) supporting packet based services and Packet Data Networks (PDN) (Release 12)", 3GPP TS 29.061 V 12.7.0, Sep. 2014, pp. 1-168.

Calhoun, P. et al., "Diameter Base Protocol", Network Working Group Request for Comments: 3588, Category: Standards Track, Sep. 2003, pp. 1-131, The Internet Society.

Office Action issued in corresponding EP Application No. 14789557.7 dated Jan. 21, 2020, 07 Pages.

* cited by examiner

MAINTAINING USER PLANE SESSION AND RESTORING CONTROL PLANE SESSION IN CASE OF CONTROL PLANE MODULE FAILURE OF GATEWAY FOR MULTICAST TRANSMISSIONS

TECHNICAL FIELD

The present invention relates to methods for transmitting multicast data and to corresponding devices.

BACKGROUND

In cellular networks, e.g., as specified by 3GPP ($3^{rd}$ Generation Partnership Project), multicast and broadcast transmission modes have been introduced, e.g., for the purpose of delivering multimedia content. An example of such broadcast and multicast transmission mode is the Multimedia Broadcast Multicast Service (MBMS), e.g., as specified in 3GPP TS 22.346 V11.0.0 (2012-09) and 3GPP TS 23.246 V12.0.0 (2013-12).

In the MBMS architecture as defined in 3GPP TS 23.246, a gateway node, referred to as MBMS-GW, which distributes MBMS data from a service layer node, referred to as BM-SC (Broadcast Multicast Service Centre) to radio access network (RAN) nodes, also interacts with a control node referred to as MME (Mobility Management Entity) or SGSN (Serving General Packet Radio Service Support Node), which controls the RAN nodes. The MBMS-GW supports establishment of user plane sessions for packet based MBMS bearer services and the forwarding of MBMS user service data over the established sessions towards end users. The MBMS-GW may for example enable point-to-multipoint transmission of data, that is, from a single source to multiple recipients. This may for example be used to enable broadcast services for streaming applications, such as broadcasting of television channels or audio, or background applications, such as downloading of files.

In the MBMS architecture, there are various potential failure points. For example, each node may fail, as well as each link between two nodes may fail. A specifically critical point of failure is the MBMS-GW. In 3GPP TS 23.007 V12.4.0 (2014-03) procedures for handling a failure of the MBMS-GW are specified. According to these procedures, when the MBMS-GW fails, all MBMS Bearer contexts affected by the failure become invalid and will be deleted. Further, since storage of context information in the MBMS-GW is volatile, all MBMS Bearer context information stored in the MBMS-GW will be lost when the MBMS-GW is restarted after the failure.

When the SGSN/MME detects a restart of a MBMS-GW to which it has ongoing control plane sessions, it typically deactivates all the related MBMS Bearer contexts locally and towards the associated RAN nodes. Further, the MME shall initiate a so called M3AP Reset procedure, or an MBMS Session Stop procedure per affected MBMS service, to deactivate the related MBMS services in the RAN. Similarly, the SGSN shall initiate an MBMS Session Stop procedure per affected MBMS service, towards to deactivate the related MBMS services in the RAN. If the MBMS-GW receives a non-initial message (i.e., MBMS session update or MBMS session stop request) from the BM-SC for which no control plane session exists, the MBMW-GW shall discard the message and return an error indication to the BM-SC.

In deployments without a Diameter Agent between the BM-SC and the MBMS-GW, the BM-SC may detect a restart of the MBMS-GW using a Diameter Origin-State-Id AVP (Attribute Value Pair) as specified in the Diameter Base Protocol. To enable fast detection of the restart, the Diameter Origin-State-Id AVP shall be included (at least) in Capabilities-Exchange-Request (CER) and Capabilities-Exchange-Answer (CEA) messages transmitted between the MBMS-GW and the BM-SC. Further, the BM-SC may detect a restart of the MBMS-GW using a Diameter Restart-Counter AVP as specified in the MBMS Heartbeat procedure as specified in 3GPP TS 23.007. The latter procedure may also be utilized in deployments with a Diameter Agent between the BM-SC and the MBMS-GW.

When the BM-SC detects a restart of a MBMS-GW with which it has at least one MBMS Bearer context, the BM-SC shall maintain the related MBMS bearer context(s), assume that all related control plane session(s) have been terminated and clean-up internal resources associated with these lost session(s). The BM-SC should then re-establish the active MBMS bearer services affected by the MBMS-GW restart by initiating MBMS Session Start procedure(s) towards the restarted MBMS-GW (or toward an alternative MBMS GW). The BM-SC shall encode the MBMS Session Start Request with the same contents as in the original MBMS Session Start Request (or per the last MBMS Session Update Request sent by the BM-SC if the original parameters were updated), with the exception that the BM-SC shall set an "MBMS session re-establishment indication" flag to signal that this message is used to re-establish an MBMS session and that, if no absolute start time ("MBMS data transfer start" parameter) has been sent, the BM-SC may change the relative start time ("time to MBMS data transfer" parameter) to fasten the restoration of the MBMS service. Further, the BM-SC should set the estimated session duration to a value corresponding to the remaining duration of the session. After detecting the failure of the MBMS-GW, the MME/SGSN would clean up the related MBMS Bearer contexts locally and towards E-UTRAN/UTRAN. After that, these sessions may be restarted via MBMS Session Start Requests from the BM-SC.

However, in some scenarios the restoration procedures described in 3GPP TS 23.007 may cause unnecessary degradation of user experience. For example, in some scenarios the failure may affect only certain parts of the MBMS-GW, e.g., interfaces or other elements utilized for handling control plane sessions with the BM-SC and MMEs, while elements utilized for handling the user plane sessions with the BM-SC and the RAN nodes remain intact. The restart of the MBMS-GW and complete re-establishment of both user plane sessions may then cause an interruption of the service for the end user. Rather, in such scenarios it would be desirable to maintain the user plane sessions during the failure, which is however not possible with the procedures described in 3GPP TS 23.007.

Accordingly, there is a need for techniques which allow for efficiently addressing a failure in a gateway handling multicast transmissions in a cellular network.

SUMMARY

According to an embodiment of the invention, a method of managing multicast transmissions in a cellular network is provided. According to the method, a control plane module of a gateway node of the cellular network establishes one or more control plane sessions associated with the multicast transmissions. Further, a user plane module of the gateway node establishes one or more user plane sessions associated with the multicast transmissions. The control plane module of the gateway node indicates context information of the control plane session(s) to an external storage. During a failure of the control plane module of the gateway node, the user plane module of the gateway node maintains the user plane session(s). After recovery from the failure of the control plane module of the gateway node, the control plane module of the gateway node receives the context information from the external storage and re-establishes at least one of the more control plane session(s) on the basis of the received context information.

According to a further embodiment of the invention, a method of managing multicast transmissions in a cellular network is provided. According to the method, a control node of the cellular network establishes one or more control plane sessions associated with the multicast transmissions with a control plane module of a gateway node of the cellular network. Further, the control node receives an indication that a failure of the control plane module of the gateway node occurred while a user plane module remained operative. In response to the indication, the control node only locally clears a context of the control plane session(s).

According to a further embodiment of the invention, a method of managing multicast transmissions in a cellular network is provided. According to the method, a node of the cellular network receives, from a control plane module of a gateway node of the cellular network, context information of one or more control plane sessions associated with the multicast transmissions and established by the control plane module of the gateway node. The node stores the received context information. After recovery from a failure of the control plane module of the gateway node, the node sends the context information to the control plane module of the gateway node.

According to a further embodiment of the invention, a gateway node for a cellular network is provided. The gateway node comprises at least one interface with respect to one or more further nodes of the cellular network. Further, the gateway node comprises a control plane module for establishing one or more user plane sessions associated with the multicast transmissions. Further, the gateway node comprises a user plane module for establishing one or more user plane sessions associated with the multicast transmissions. The control plane module is configured to indicate context information of control plane session(s) to an external storage. Further, the control plane module is configured to, after recovery from a failure of the control plane module, receive the context information from the external storage and re-establish at least one the control plane session(s) on the basis of the received context information. The user plane module is configured to maintain the user plane session(s) during the failure of the control plane module of the gateway node.

According to a further embodiment of the invention, a control node for a cellular network is provided. The control node comprises an interface to a gateway node. Further, the control node comprises at least one processor. The at least one processor is configured to establish one or more control plane sessions associated with the multicast transmissions with a control plane module of the gateway node. Further, the at least one processor is configured to receive an indication that a failure of the control plane module of the gateway node occurred while a user plane module of the gateway node remained operative. Further, the at least one processor is configured to, in response to the indication, only locally clear a context of the control plane session(s).

According to a further embodiment of the invention, a node for a cellular network is provided. The node comprises an interface to a gateway node. Further, the node comprises a memory. Further, the node comprises at least one processor. The at least one processor is configured to receive, from a control plane module of the gateway node, context information of one or more control plane sessions associated with multicast transmissions in the cellular network and established by the control plane module of the gateway node. Further, the at least one processor is configured to store the received context information in the memory. Further, the at least one processor is configured to, after recovery from a failure of the control plane module of the gateway node, send the context information to the control plane module of the gateway node.

According to a further embodiment of the invention, a computer program or computer program product is provided, e.g., in the form of a non-transitory storage medium, which comprises program code to be executed by at least one processor of a gateway node of a cellular network. Execution of the program code by the at least one processor causes a control plane module of the gateway node to establish one or more user plane sessions associated with the multicast transmissions. Further, execution of the program code by the at least one processor causes a user plane module of the gateway node to establish one or more user plane sessions associated with the multicast transmissions. Further, execution of the program code by the at least one processor causes the control plane module to indicate context information of control plane session(s) to an external storage. Further, execution of the program code by the at least one processor causes the control plane module to, after recovery from a failure of the control plane module, receive the context information from the external storage and re-establish at least one the control plane session(s) on the basis of the received context information. Further, execution of the program code by the at least one processor causes the user plane module to maintain the user plane session(s) during the failure of the control plane module of the gateway node.

According to a further embodiment of the invention, a computer program or computer program product is provided, e.g., in the form of a non-transitory storage medium, which comprises program code to be executed by at least one processor of a control node of a cellular network. Execution of the program code causes the at least one processor to establish one or more control plane sessions with a control plane module of the gateway node. Further, execution of the program code causes the at least one processor to receive an indication that a failure of the control plane module of the gateway node occurred while a user plane module of the gateway node remained operative. Further, execution of the program code causes the at least one processor to only locally clear a context of the control plane session(s).

According to a further embodiment of the invention, a computer program or computer program product is provided, e.g., in the form of a non-transitory storage medium, which comprises program code to be executed by at least one processor of a node of a cellular network. Execution of the program code causes the at least one processor to receive, from a control plane module of the gateway node, context information of one or more control plane sessions associated with multicast transmissions in the cellular network and established by the control plane module of the gateway node. Further, execution of the program code causes the at least one processor to store the received context information in a memory of the node. Further, execution of the program code causes the at least one processor to, after recovery from a failure of the control plane module of the gateway node, send the context information to the control plane module of the gateway node.

Details of such embodiments and further embodiments will be apparent from the following detailed description of embodiments.

DETAILED DESCRIPTION OF EMBODIMENTS

Figure 1:
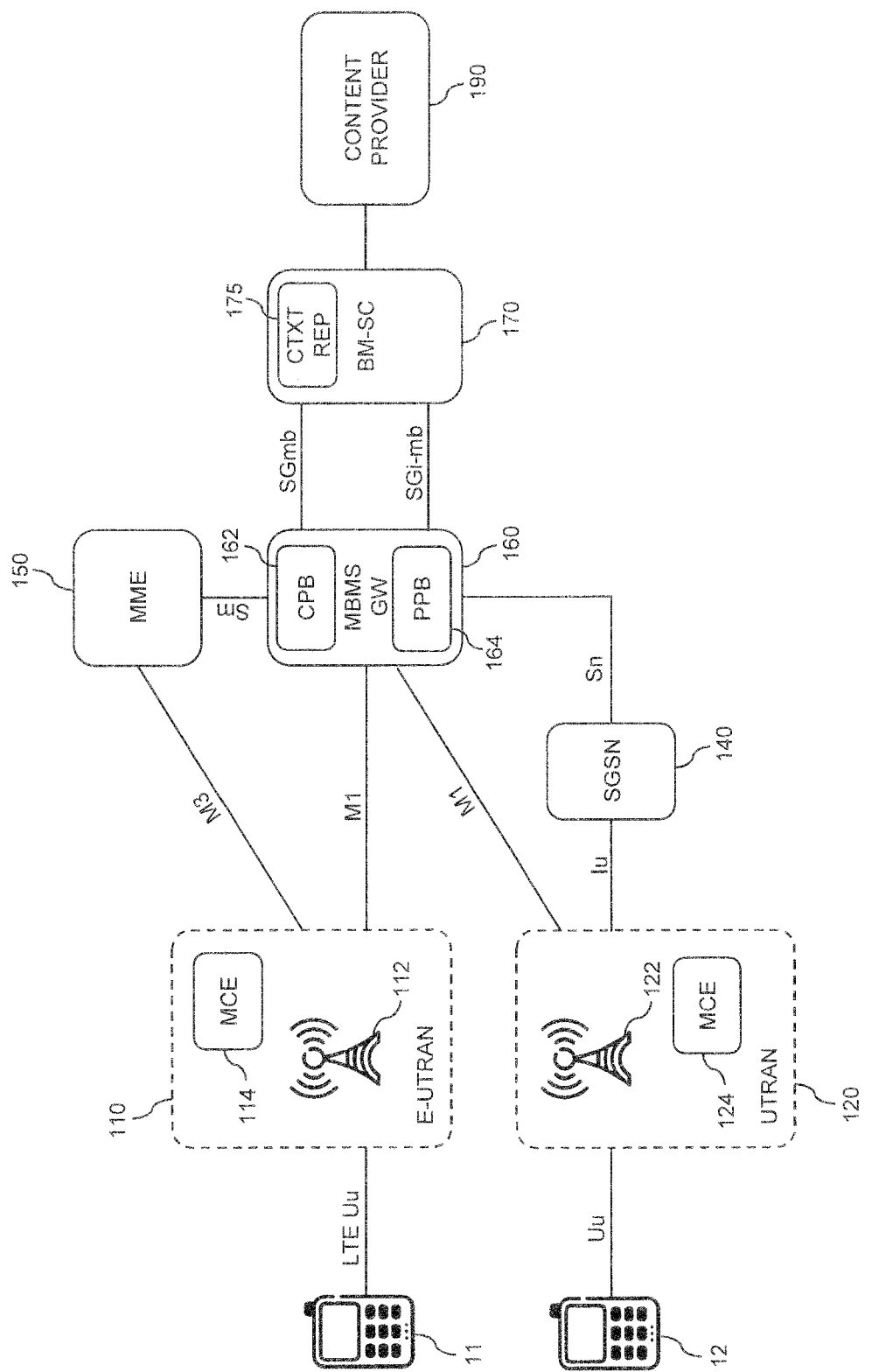
FIG. 1 schematically illustrates a multicast transmission architecture according to an embodiment of the invention, which is based on a gateway node having a user plane module and a control plane module.

In the following, concepts according to embodiments of the invention will be explained in more detail by referring to the accompanying drawings. The illustrated concepts relate to handling data traffic in a data communication system. Specifically, the concepts relate to managing multicast transmissions in a cellular network. The cellular network may for example be based on the LTE (Long Term Evolution) technology specified by 3GPP, and an MBMS architecture as for example described in 3GPP TS 23.246 may be utilized for performing the multicast transmissions. However, it is to be understood that the cellular network could implement other technologies as well, e.g., UMTS (Universal Mobile Telecommunications System) or GSM (Global System for Mobile Communication) in connection with GPRS (General Packet Radio Service). The multicast transmissions generally include transmissions which are intended to be simultaneously received by multiple recipients, e.g., UEs connected to the cellular network. These transmissions may be performed in a broadcast mode, in which the transmissions are intended to be received by all UEs in a given coverage area of the cellular network, or in a multicast mode, in which the transmissions are intended to be received by a selected group of the UEs in a given coverage area of the cellular network. The multicast transmissions may in particular be MBMS transmissions.

The concepts according to embodiments as illustrated in the following, relate to handling of a failure in a gateway node, which conveys traffic user plane of multicast transmissions. In these concepts, it is assumed that the gateway node is based on a modular architecture with a control plane module to handle control plane sessions associated with the multicast transmissions and a user plane module to handle user plane sessions associated with the multicast transmissions. The control plane module indicates context information of the control plane sessions to an external storage, where the context information is stored. The external storage may be an element which is provided separately from the gateway node, e.g., in a further node of the cellular network. However, the external storage could also be provided as a further module of the gateway node, which is however external with respect to the control plane module and therefore typically not affected by a failure of the control plane module. In the case of a failure which concerns the control plane module, but not the user plane module, ongoing user plane sessions can thus be maintained. When the control plane module has recovered from the failure, the control plane sessions corresponding to the ongoing user plane sessions are re-established. For this purpose, the control plane module obtains the stored context information from the external storage. The gateway node may then utilize the context information for restoring a context of the control plane sessions to a state before the failure. The gateway node may also indicate the nature of the failure, i.e., that the failure concerned the control plane module, but not the user plane module, to other nodes of the cellular network, e.g., control nodes. These other nodes may then adapt there reaction to the failure or actions for recovering from the failure accordingly.

In the case of utilizing an MBMS architecture as for example described in 3GPP TS 23.246, the gateway node may correspond to an MBMS-GW. Further elements involved in the illustrated concepts may be one or more control nodes, a service layer node, and/or one or more RAN nodes. The control nodes may correspond to MMEs and/or SGSNs. The service layer node may correspond to a BM-SC. The RAN nodes may correspond to MCEs. Each of such MCEs may be integrated in a corresponding LTE base station, referred to as eNB (evolved Node B) or may be provided as separate components associated with one or more eNBs.

FIG. 1 schematically illustrates an MBMS architecture which may be used for implementing the concepts as outlined above. The illustrated MBMS architecture includes a RAN 110 of the cellular network. The RAN 110 is based on the LTE radio access technology and is therefore referred to as E-UTRAN (Evolved UMTS Terrestrial Radio Access Network). As further, illustrated also a further RAN 120 may be provided, which is based on the UMTS radio access technology and is therefore referred to as UTRAN (UMTS Terrestrial Radio Access Network). Each of the RANs 110, 120 provides corresponding base stations 112, 122. In the case of the E-UTRAN 110, these base stations are also referred to as eNB. In the case of the UTRAN 120, these base stations are also referred to as NB (Node B). In addition, the RANs may include MCEs 114, 124 which are responsible for coordinating MBMS transmissions. The MCEs 114, 124 may be implemented as standalone components or may be integrated in another RAN node. For example, the illustrated exemplary MCE 114 could be integrated in the illustrated exemplary eNB 112. The RANs 110, 120 may be used by UEs for connecting to the cellular network and receiving MBMS transmissions. By way of example, FIG. 1 illustrates an exemplary UE 11 connected to the E-UTRAN 120, via an interface referred to as LTE Uu, and an exemplary UE 12 connected to the UTRAN 120, via an interface referred to as Uu.

Further, the illustrated MBMS architecture includes an MBMS-GW 160. The MBMS-GW 160 carries user plane traffic of the MBMS transmissions from a BM-SC 170 to the RANs 110, 120. The user plane traffic may be based on content from a content provider 190. For conveying the user plane traffic of the MBMS transmissions, the MBMS-GW 160 sets up one or more user plane sessions with the RAN nodes 112, 114, 122, 124, which is accomplished via an interface referred to as M1. In the case of the user plane traffic via the M1 interface, a tunneling protocol referred to as GTP-U (GPRS Tunneling Protocol-User plane). Between the BM-SC 170 and the MBMS-GW 160, the user plane traffic is transmitted via an interface referred to as SGi-mb. In addition, control plane traffic between the BM-SC 170 and the MBMS-GW 160 may be transmitted via an interface referred to as SGmb.

For controlling the MBMS transmissions of a given MBMS session, a control plane is established by the MBMS-GW 160. In the case of the UTRAN 120, the control plane extends via an SGSN 140 and interfaces referred to as Sn and Iu. In the case of the E-UTRAN 110, the control plane extends via an MME 150 and interfaces referred to as Sm and M3. The Sm, Sn, Iu and M3 interfaces are based on a tunneling protocol referred to as GTP-C (GPRS Tunneling Protocol-Control plane).

As illustrated, the MBMS-GW 160 is implemented on the basis of a modular architecture in which control plane handling and user plane handling are performed by separate hardware modules. In the illustrated example, these modules are a control plane module 162 implemented as a Control Processing Board (CPB), and a user plane module 164 implemented as a Packet Processing Board (PPB). Functionalities of the control plane module may include an MBMS Session Controller (MSC), which may be responsible for establishing and controlling the control plane connection between the BM-SC 170 and the MME 150 or SGSN 140 by processing MBMS service control messages received on the SGmb and Sm/Sn interfaces. Functionalities of the user plane module may include a Packet Processor (PP), which may be responsible for maintaining the user plane connection through the MBMS-GW 160 by forwarding MBMS data in a downlink direction from the BM-SC 170 to the RAN 110, 120. In this connection, the PP may handle various packet processing tasks, such as administration of GTP-U tunnels and Differentiated Services Code Point (DSCP) packet marking, based on configuration data.

As outlined above, the illustrated concepts may be applied to address an isolated failure of the control plane module 162 in the MBMS-GW 160, i.e., a failure in which the control plane module 162 fails, but the user plane module 164 remains operative. For restoration of a context of control plane sessions through the control plane module 162, an external context repository (CTXT REP) 175 is provided in the BM-SC 170. After an isolated failure of the control plane module 162, the context information which was lost in the MBMS-GW 160 due to the failure may be obtained from the context repository 175 and restored in the MBMS-GW 160. Exemplary processes which may be involved in such handling of an isolated failure of the control plane module 162 will now be explained in more detail with reference to FIGS. 2 to 8.

Figure 2:
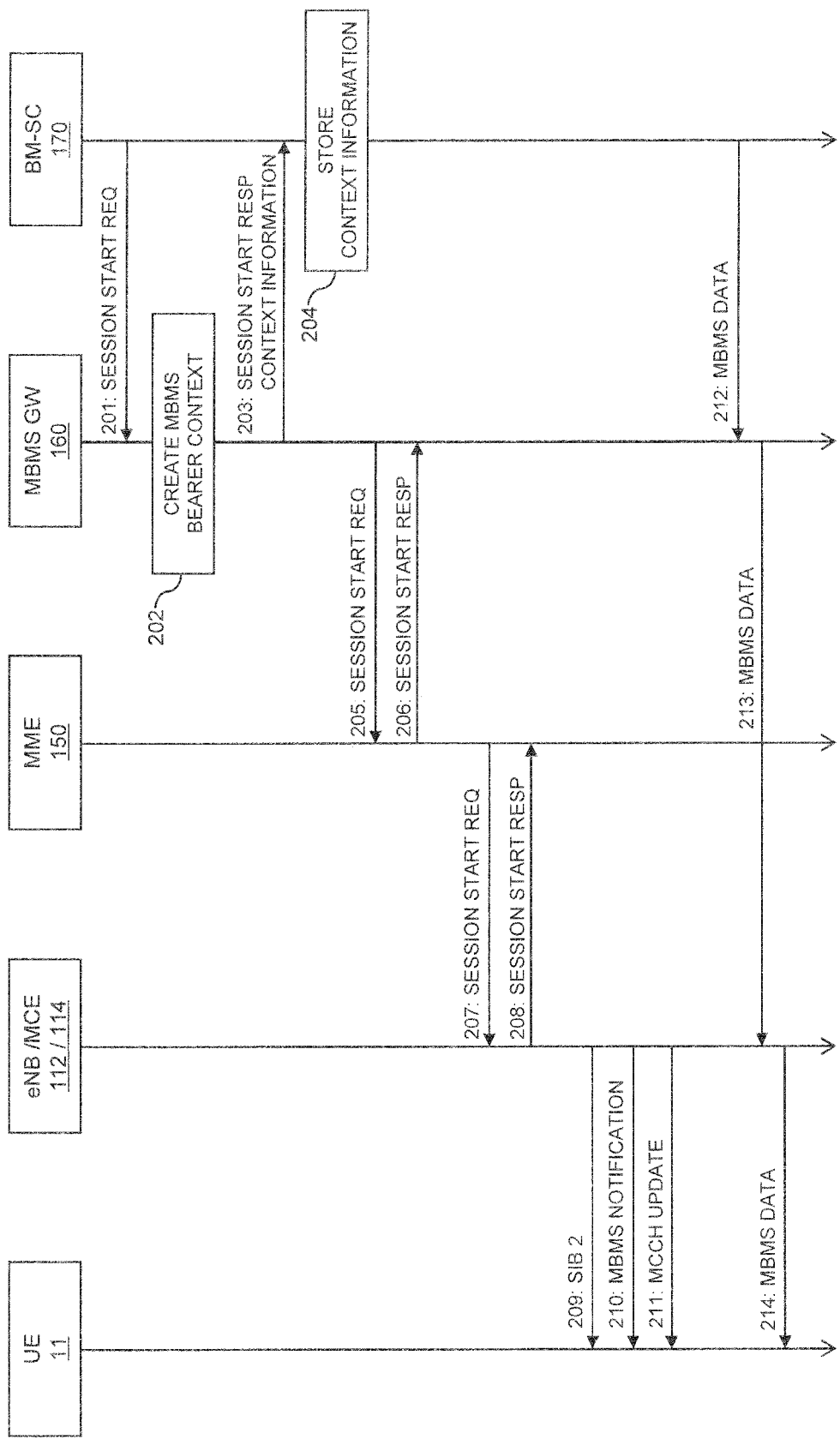
FIG. 2 schematically illustrates exemplary processes of setting up a multicast transmission session in the architecture of FIG. 1.

FIG. 2 shows exemplary processes which may be used to set up an MBMS session when utilizing the MBMS architecture as illustrated in FIG. 1. The processes of FIG. 2 involve the UE 11, the eNB 112 and MCE 114 (which are assumed to be implemented as a single node in this figure), the MME 150, the MBMS-GW 160, and the BM-SC 170. The MME 150 may be part of an MME pool, which also includes other MMEs. The MMEs of the MME pool may co-operate by load sharing.

Initially, the BM-SC 170 sends a session start request 201 to the MBMS-GW 160. As illustrated by step 202, the MBMS-GW 160 then creates an MBMS bearer context associated with the MBMS session. This involves assigning a C-TEID (Common Tunnel End Point Identifier) and a source IP address and an IP multicast destination address to be utilized on the M1 interface for this MBMS session. Further, the MBMS-GW 160 responds with a session start response 203 to the session start request 201. In the processes of FIG. 2, it is assumed that the session start response 203 further includes context information of the MBMS bearer context created by the MBMS-GW at step 202, in particular the C-TEID, and the source IP address and IP multicast destination address for the M1 interface. Further, the context information includes a session identifier to allow distinguishing between context information of different MBMS sessions.

The MBMS-GW 160 then proceeds by sending a session start request 205 to the MME 150. The MME 150 responds with a session start response 206. The session start request 205 and session start response 206 are transmitted over the Sm interface between the MBMS-GW 160 and the MME 150 and establish a control plane session between the MBMS-GW 160 and the MME 150. At this point, also the MME 150 creates an MBMS bearer context associated with the MBMS session. The session start request 205 may be addressed to one IP (Internet Protocol) address for each participating MME pool.

To implement load sharing, the MBMS-GW 160 may use the IP address of the primary MME to lookup the IP addresses of all the MME pool members, and may then select an MME from the pool. A Round Robin method may be used to distribute the load. Information about MME pool members may be configured locally in the MBMS-GW 160. In the illustrated example, the MME 150 is assumed to be the selected by the MBMS-GW 160.

The session start request 205 may indicate the forthcoming start of an MBMS transmission and provide information on session attributes. For example, such information may include an IP multicast address to be used for the MBMS transmission, the C-TEID of a GTP-U tunnel to be used for the MBMS transmission, and/or a TMGI (Temporary Mobile Group Identity) to be used for the MBMS transmission. Using such information, the MBMS-GW 160 may keep track of the MME 150 which is used for this MBMS session. Further, in session start request 205 and session start response 206, the MBMS-GW 160 and the MME 150 may exchange a local TEID (Tunnel Endpoint Identifier) and remote TEID to be used as identification in subsequent control plane signaling for the MBMS session. Such information may be stored in the MBMS bearer context stored at the MBMS GW 160 and in the MBMS bearer context stored at the MME 150.

The MME 150 then proceeds by sending a session start request 207 to the participating MCEs and eNBs, such as to the eNB/MME 112/114. The eNB/MCE 112/114 responds with a session start response 208. The session start request 207 and session start response 208 are transmitted over the M3 interface between the MME 150 and the eNB/MCE 112/114 and establish a control plane session between the MME 150 and the eNB/MCE 112/114. At this point also the eNB/MCE 112/114 creates an MBMS bearer context associated with the MBMS session.

The session start request 207 may indicate the forthcoming start of an MBMS transmission and provide information on session attributes. For example, such information may include the IP multicast address to be used for the MBMS transmission, the C-TEID of the GTP-U tunnel to be used for the MBMS transmission, and the TMGI to be used for the MBMS transmission. Further, the session start request 207 may include an identifier of the MME 150, e.g., in the form of an MME MBMS M3AP ID, an indication of the MBMS service area, and/or QoS parameters. The session start response 208 may include an identifier of the MCE 114, e.g., in the form of an MCE MBMS M3AP ID. Such information may be stored in the MBMS bearer context stored at the MME 150 and at the MCE 114.

The MCE 114 and eNB 112 may then prepare the MBMS transmission by sending an MBSFN (Multicast-Broadcast Single Frequency Network) resource allocation to be used for the multicast transmission to the UE 11. As illustrated by 209, this information may be broadcasted by the eNB 112 in SIB 2 (System Information Block 2).

Subsequently, the MCE 114 and eNB 112 may initiate the MBMS transmission by sending an MBMS notification 210 and an MCCH (Multicast Control Channel) update 211 to the UE 11.

Then the actual MBMS transmission may be performed by transmitting user plane traffic of the MBMS session to the UE 11, as illustrated by transmission of MBMS data 212 from the BM-SC 170 to the MBMS-GW 160, by transmission of MBMS data 213 from the MBMS-GW 160 to the eNB/MCE 112/114, and by transmission of MBMS data 214 from the eNB/MCE 112/114 to the UE 11. The MBMS data 212 may be transmitted in a unicast tunnel. The MBMS data 213 may be transmitted in an IP multicast tunnel (using the above-mentioned C-TEID and IP multicast address), and the MBMS data 214 may be transmitted on the MTCH (Multicast Traffic Channel) of the LTE Uu radio interface.

Subsequent control processes, such as stopping or modifying the MBMS session, typically require further control plane signaling involving the MBMS-GW 160, in particular the control plane module 162 of the MBMS-GW 160. With reference to FIGS. 3-8, exemplary processes will be further described, which may be used to address an isolated failure of control plane module 162, i.e., a failure in which the control plane module 162 fails while the user plane module 164 remains operative. These processes involve the MCE 114, the MME 150 (referred to as MME 1), and the MBMS-GW 160. In addition, also an alternative MME 151 from the same MME pool (referred to as MME 2) may participate in the processes. It should be understood that also in this case, the MCE 114 may be integrated in an eNB, such as in the eNB 112.

Figure 3:
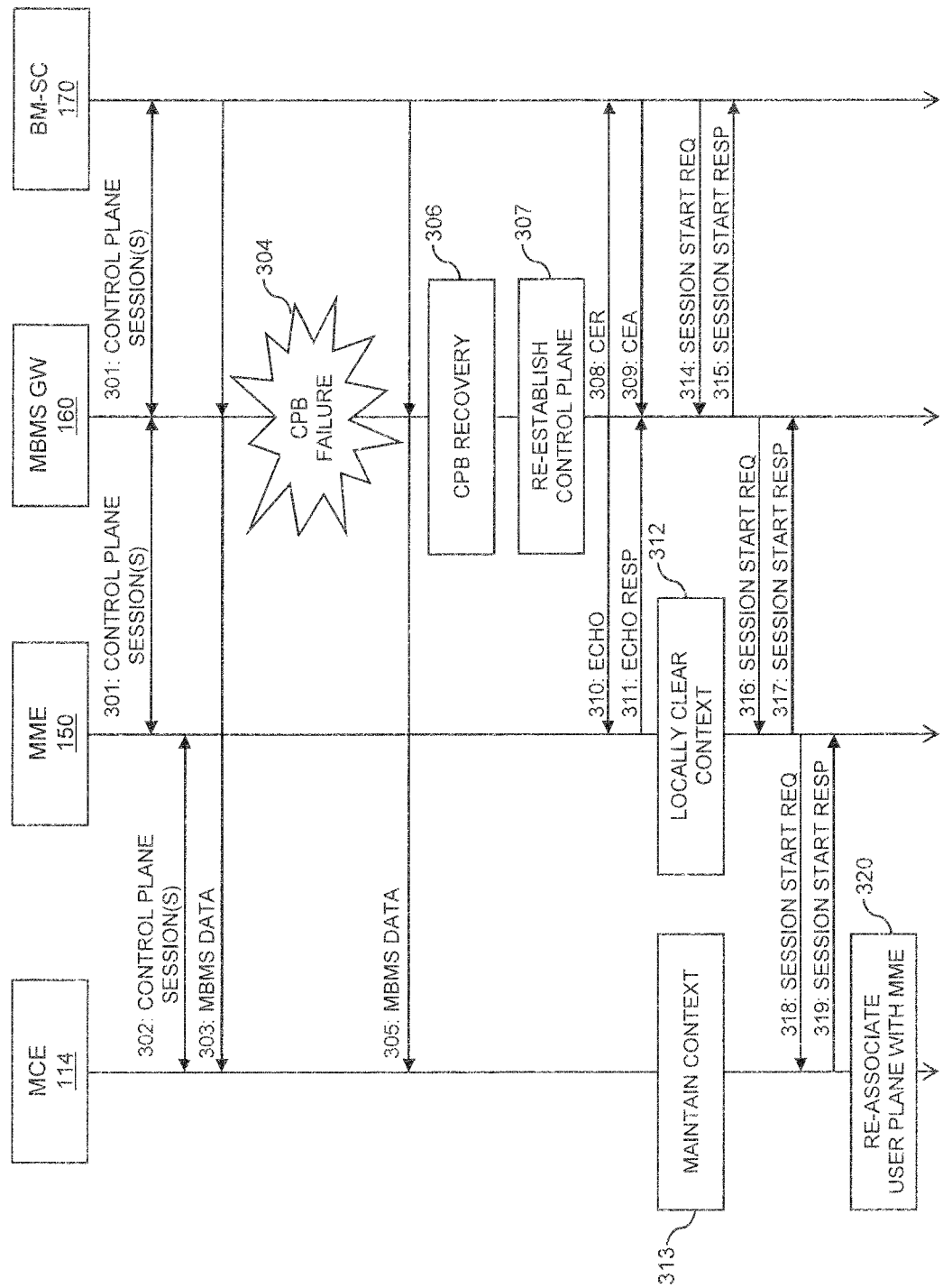
FIG. 3 schematically illustrates exemplary processes of handling a failure of the control plane module of the gateway node according to an embodiment of the invention.

FIG. 3 refers to a scenario in which the control plane module 162 fails and, after recovery of the control plane module 162, the control plane sessions are re-established with the same MME, i.e., the MME 150.

As illustrated, one or more control plane sessions 301 associated with corresponding MBMS sessions are established between the BM-SC 170, the MBMS-GW 160 and the MME 150, and associated control plane sessions 302 are established between the MME 150 and the MCE 114. Further, MBMS data 303 associated with the MBMS sessions are being transmitted in ongoing user plane sessions from the BM-SC 170 via the MBMS-GW 160 to the MCE 114.

In this situation, a failure of the control plane module 162 of the MBMS-GW 160 occurs, as illustrated by 304.

After the failure, the control plane module 162 stops sending messages to the MME 150 on the Sm interface. Since the user plane module 164 of the MBMS-GW 160 is unaffected by the failure, transmission of MBMS data continues on the SGi-mb interface between the BM-SC 170 and the MBMS-GW 160 and on the M1 interface between the MBMS-GW 160 and the MCE 114, as illustrated by 305. Accordingly, the user plane sessions associated with the MBMS sessions are maintained, while the control plane sessions associated with the MBMS sessions are interrupted at the MBMS-GW 150.

At some point, the control plane module 162 of the MBMS-GW 160 recovers from the failure, as indicated by step 306. At that time, the BM-SC 170 still continues to deliver the MBMS data towards the MBMS-GW 160 via the SGi-mb interface, and the MBMS-GW 160 continues to multicast the data towards the MCE 114 via the M1 interface, i.e., the user plane sessions through the user plane module 164 of the MBMS-GW 160 are still maintained.

The control plane module 162 of the MBMS-GW 160 then starts re-establishing the control plane of the MBMS sessions, as indicated by step 307. For this purpose, the control plane module 162 of the MBMS-GW 160 reconnects to the BM-SC 170, as illustrated by messages 308 and 309. Reconnecting to the BM-SC 170 involves transmitting a CER message 308 from the control plane module 162 of the MBMS-GW 160 to the BM-SC 170 and transmitting a CEA message 309 from the BM-SC 170 to the control plane module 162 of the MBMS-GW 160.

Further, the control plane module 162 of the MBMS-GW 160 reconnects to the MME 150, as illustrated by messages 310 and 311. Reconnecting to the MME 150 involves transmitting a GTP-C Echo Request 310 from the control plane module 162 of the MBMS-GW 160 to the MME 150 and transmitting a GTP-C Echo Response 311 from the MME 150 to the control plane module 160 of the MBMS-GW 160.

For the reconnection procedures over the SGmb interface to the BM-SC 170 and over the Sm interface to the MME 150 the control plane module 162 increases a value of a counter which tracks restarts of only the control plane module 162, referred to as "CPB restart counter". The value of the CPB restart counter is indicated by a corresponding AVP in messages transmitted on the SGmb interface, referred to as "CPB restart counter AVP", or by a corresponding IE (Information Element) in messages transmitted on the Sm interface, referred to as "CPB restart counter IE". At the same time, the control plane module 162 maintains a value of a counter which tracks restarts of the MBMS-GW 160 as a whole, referred to as "restart counter". The value of the restart counter is indicated by a corresponding AVP in messages transmitted on the SGmb interface, referred to as "restart counter AVP", or by a corresponding IE in messages transmitted on the Sm interface, referred to as "restart counter IE". For example, the restart counter AVP and the CPB restart counter AVP may be indicated in the CER message 308 transmitted from the control plane module 162 of the MBMS-GW 160 to the BM-SC 170. Further, the restart counter IE, and the CPB restart counter IE may be indicated in the GTP-C Echo Request message 310 transmitted from the control plane module 162 of the MBMS-GW 160 to the MME 150. By identifying the increase of the CPB restart counter and the maintaining of the restart counter on the basis of the received messages, the respective other node, i.e., the MME 150 or BM-SC 170 may identify that the MBMS-GW 160 recovered from an isolated failure of the control plane module 162 and react accordingly. For example, the BM-SC 170 may initiate re-establishment of control plane sessions associated with the ongoing user plane sessions. Further, the MME 150 may react by clearing the MBMS bearer context only locally, as indicated by step 312. Here, the clearing of the context being only locally means that the MME 150 deletes context information of the MBMS bearer context as stored at the MME 150 and releases resources of the MBMS bearer context which are provided by the MME 150. Here, it should be noted that the clearing of the MBMS bearer context will typically relate to all control plane sessions which were established with the failed control plane module 162 of the MBMS-GW 160. Since the clearing of the context is only local, the MME 150 does not provide corresponding indications to further nodes of the cellular network, e.g., to the MCE 114. For example, in response to identifying that the failure is an isolated failure of the control plane module 162 of the MBMS-GW 160, the MME 150 will not send a stop session request to the MCE 114. Accordingly, operation of the MCE 114 will be unaffected by the failure and recovery of the control plane module 162 of the MBMS-GW 160, and the MCE 114 will maintain the MBMS bearer context, as indicated by step 313.

After the control plane module 162 of the MBMS-GW 160 has reconnected to the BM-SC 170 and to the MME 150, re-establishment of the control plane session(s) may continue by the BM-SC 170 sending a session start request 314 to the control plane module 162 of the MBMS-GW 160, to re-establish the part of the control plane session(s) between the BM-SC 170 and the control plane module 162 of the MBMS-GW 160. The control plane module 162 of the MBMS-GW 160 responds to the session start request 314 by sending a session start response 315 to the BM-SC 170. Further, the control plane module 162 of the MBMS-GW 160 sends a session start request 316 to the MME 150, and the MME 150 responds to the session start request 316 by sending a session start response 317 to the control plane module 162 of the MBMS-GW 160.

For re-establishing the control plane session(s), the BM-SC 170 provides the previously stored context information of the MBMS bearer context at the MBMS-GW 160 back to the control plane module 162 of the MBMS-GW 160. In the example of FIG. 3, this is assumed to be accomplished in corresponding AVPs of the session start request 314. For example, the session identifier may be indicated in an AVP referred to as "Session Id", the C-TEID may be indicated in an AVP referred to as "C-TEID", the source IP address of the MBMS-GW 160 for the M1 interface may be indicated in an AVP referred to as "MBMS-GW-M1-Source-IP-Address" or "MBMS-GW-M1-Source-IPv6-Address", depending on whether IP version 4 or IP version 6 is utilized on the M1 interface, and the IP multicast destination address for the M1 interface may be indicated in an AVP referred to as "MBMS-GW-M1-Destination-Address" or "MBMS-GW-M1-Destination-IPv6-Address", depending on whether IP version 4 or IP version 6 is utilized on the M1 interface. These AVPs may be defined for RAR messages of the Diameter based protocol utilized on the SGmb interface. The context information may be utilized to restore the MBMS bearer context in the MBMS-GW 160 to a state before the failure.

In case multiple MMEs exist in the relevant MME pool, the MBMS-GW 160 may also perform MME selection. In the example of FIG. 3, it is assumed that the MME 150 is selected again or is the only MME in the relevant MME pool. Accordingly, the control plane module 162 of the MBMS-GW 160 re-establishes the control plane sessions of the MBMS sessions with the MME 150 by sending the session start request 316 to the MME 150, to which the MME 150 responds with the session start response 317. By utilizing the restored context information, the session start request 316 is sent with the same parameters as initially utilized when establishing the MBMS sessions.

The MME 150 then proceeds by sending a session start request 318 to the participating MCE 114, and the MCE 114 responds with a session start response 319. Since the session start request 318 is based on the restored context information, it indicates the same session identifier as initially utilized when establishing the MBMS sessions. Accordingly, the MCE 114 can re-associate the ongoing user plane sessions with the re-established control plane sessions with the MME 150, as indicated by step 320. Here, it should be noted that between in the MME 150 and the MCE 114 the TMGI, a parameter referred to as "Absolute-Time-ofMBMS-Data", and optionally a Flow Identifier may be utilized as the session identifier. Mapping between the latter identifiers and the Session Id utilized in messages between the MBMS-GW 160 and the BM-SC 170 may be accomplished by the control plane module 162 of the MBMS-GW 160. Also the latter types of session identifiers may be saved in the external storage for later restoration procedures.

Figure 4:
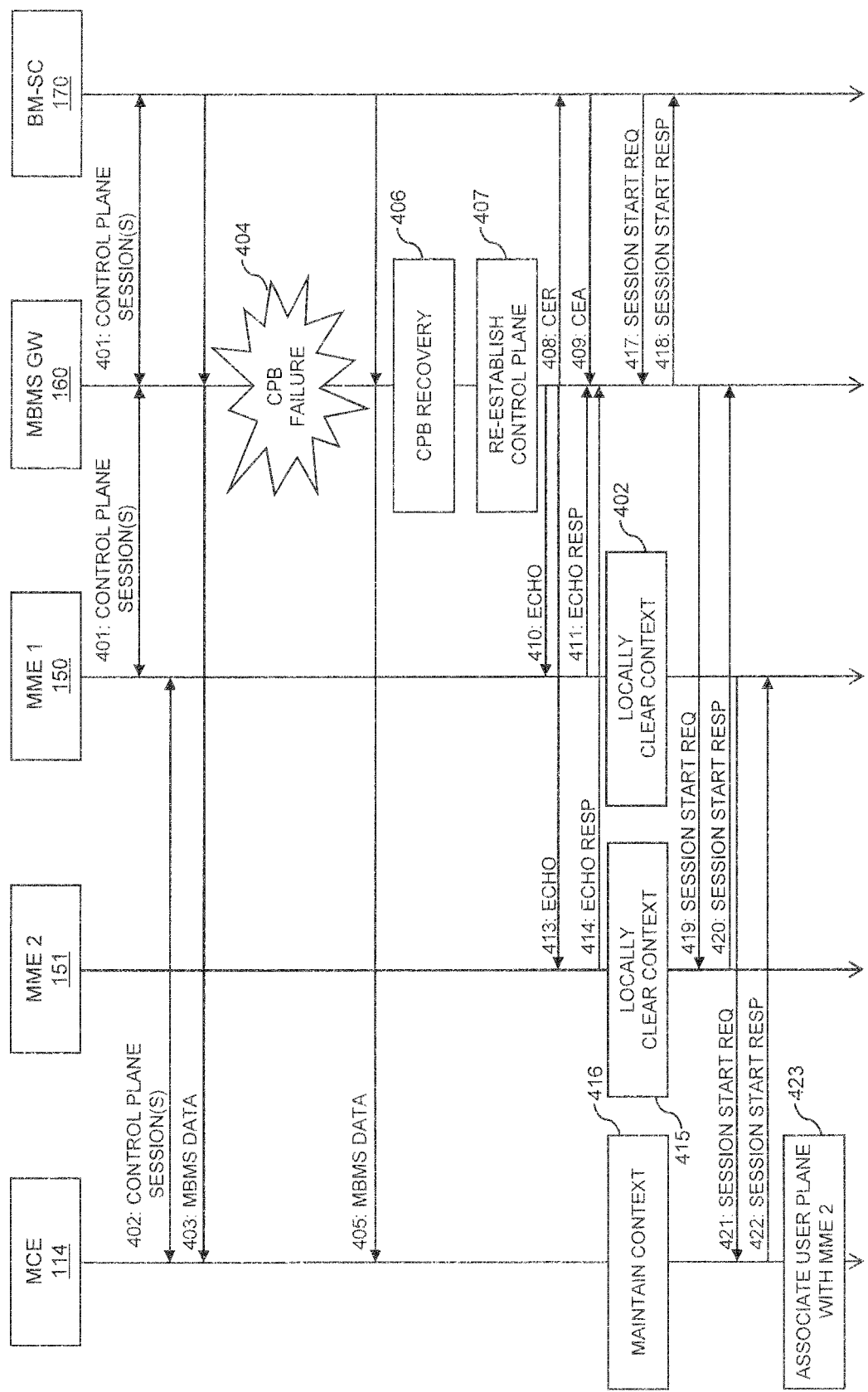
FIG. 4 schematically illustrates further exemplary processes of handling a failure of the control plane module of the gateway node according to an embodiment of the invention.

FIG. 4 refers to a scenario in which the control plane module 162 fails and, after recovery of the control plane module 162, the control plane sessions are re-established with the another MME, i.e., the MME 151.

As illustrated, one or more control plane sessions 401 associated with corresponding MBMS sessions are established between the MBMS-GW 160 and the MME 150, and associated control plane sessions 402 are established between the MME 150 and the MCE 114.

Further, MBMS data 403 associated with the MBMS sessions are being transmitted in ongoing user plane sessions from the BM-SC 170 via the MBMS-GW 160 to the MCE 114.

In this situation, a failure of the control plane module 162 of the MBMS-GW 160 occurs, as illustrated by 404.

After the failure, the control plane module 162 stops sending messages to the MME 150 on the Sm interface. Since the user plane module 164 of the MBMS-GW 160 is unaffected by the failure, transmission of MBMS data continues on the SGi-mb interface between the BM-SC 170 and the MBMS-GW 160 and on the M1 interface between the MBMS-GW 160 and the MCE 114, as illustrated by 405. Accordingly, the user plane sessions associated with the MBMS sessions are maintained, while the control plane sessions associated with the MBMS sessions are interrupted at the MBMS-GW 150.

At some point, the control plane module 162 of the MBMS-GW 160 recovers from the failure, as indicated by step 406. At that time, the BM-SC 170 still continues to deliver the MBMS data towards the MBMS-GW 160 via the SGi-mb interface, and the MBMS-GW 160 continues to multicast the data towards the MCE 114 via the M1 interface, i.e., the user plane sessions through the user plane module 164 of the MBMS-GW 160 are still maintained.

The control plane module 162 of the MBMS-GW 160 then starts re-establishing the control plane of the MBMS sessions, as indicated by step 407. For this purpose, the control plane module 162 of the MBMS-GW 160 reconnects to the BM-SC 170, as illustrated by messages 408 and 409. Reconnecting to the BM-SC 170 involves transmitting a CER message 408 from the control plane module 162 of the MBMS-GW 160 to the BM-SC 170 and transmitting a CEA message 409 from the BM-SC 170 to the control plane module 162 of the MBMS-GW 160.

Further, the control plane module 162 of the MBMS-GW 160 reconnects to the MMEs of the pool, in the illustrated example to MMEs 150 and 151, as illustrated by messages 410, 411, 412, and 413. Reconnecting to the MME 150 involves transmitting a GTP-C Echo Request 410 from the control plane module 162 of the MBMS-GW 160 to the MME 150, transmitting a GTP-C Echo Response from the MME 150 to the control plane module 160 of the MBMS-GW 160. Transmitting a GTP-C Echo Request 412 from the control plane module 162 of the MBMS-GW 160 to the MME 151, and transmitting a GTP-C Echo Response from the MME 151 to the control plane module 160 of the MBMS-GW 160.

For the reconnection procedures over the SGmb interface to the BM-SC 170 and over the Sm interface to the MME 150 the control plane module 162 increases the value of the CPB restart counter. The value of the CPB restart counter is indicated by the CPB restart counter AVP in messages transmitted on the SGmb interface or by the CPB restart counter IE in messages transmitted on the Sm interface. At the same time, the control plane module 162 maintains a value of the restart counter. The value of the restart counter is indicated by the restart counter AVP in messages transmitted on the SGmb interface or by the restart counter IE in messages transmitted on the Sm interface. For example, the restart counter AVP and the CPB restart counter AVP may be indicated in the CER message 408 transmitted from the control plane module 162 of the MBMS-GW 160 to the BM-SC 170. Further, the restart counter IE, and the CPB restart counter IE may be indicated in the GTP-C Echo Request messages 410, 412 transmitted from the control plane module 162 of the MBMS-GW 160 to the MME 150, 151. By identifying the increase of the CPB restart counter and the maintaining of the restart counter on the basis of the received messages, the respective other node, i.e., the MME 150, 151 or BM-SC 170 may identify that the MBMS-GW 160 recovered from an isolated failure of the control plane module 162 and react accordingly. For example, the BM-SC 170 may initiate re-establishment of control plane sessions associated with the ongoing user plane sessions. Further, the MME 150, 151 may react by clearing the MBMS bearer context only locally, as indicated by steps 414, 415. Here, the clearing of the context being only locally means that the MME 150, 151 deletes context information of the MBMS bearer context as stored at the MME 150, 151 and releases resources of the MBMS bearer context which are provided by the MME 150, 151. Here, it should be noted that the clearing of the MBMS bearer context will typically relate to all control plane sessions which were established with the failed control plane module 162 of the MBMS-GW 160. Since the clearing of the context is only local, the MME 150, 151 does not provide corresponding indications to further nodes of the cellular network, e.g., to the MCE 114. For example, in response to identifying that the failure is an isolated failure of the control plane module 162 of the MBMS-GW 160, the MME 150 will not send a stop session request to the MCE 114. Accordingly, operation of the MCE 114 will be unaffected by the failure and recovery of the control plane module 162 of the MBMS-GW 160, and the MCE 114 will maintain the MBMS bearer context, as indicated by step 416.

After the control plane module 162 of the MBMS-GW 160 has reconnected to the BM-SC 170 and to the MME 150, re-establishment of the control plane session(s) may continue by the BM-SC 170 sending a session start request 417 to the control plane module 162 of the MBMS-GW 160, to re-establish the part of the control plane session(s) between the BM-SC 170 and the control plane module 162 of the MBMS-GW 160. The control plane module 162 of the MBMS-GW 160 responds to the session start request 417 by sending a session start response 418 to the BM-SC 170. Further, the control plane module 162 of the MBMS-GW 160 sends a session start request 419 to the MME 151, and the MME 151 responds to the session start request 419 by sending a session start response 420 to the control plane module 162 of the MBMS-GW 160.

For re-establishing the control plane session(s), the BM-SC 170 provides the previously stored context information of the MBMS bearer context at the MBMS-GW 160 back to the control plane module 162 of the MBMS-GW 160. In the example of FIG. 4, this is assumed to be accomplished in corresponding AVPs of the session start request 417. For example, the session identifier may be indicated in the Session Id AVP, the C-TEID may be indicated in the C-TEID AVP, the source IP address of the MBMS-GW 160 for the M1 interface may be indicated in the MBMS-GW-M1-Source-IP-Address AVP or MBMS-GW-M1-Source-IPv6-Address AVP, depending on whether IP version 4 or IP version 6 is utilized on the M1 interface, and the IP multicast destination address for the M1 interface may be indicated in the MBMS-GW-M1-Destination-Address AVP or MBMS-GW-M1-Destination-IPv6-Address AVP, depending on whether IP version 4 or IP version 6 is utilized on the M1 interface. The context information may be utilized to restore the MBMS bearer context in the MBMS-GW 160 to a state before the failure.

The MBMS-GW 160 may then perform MME selection. In the example of FIG. 4, it is assumed that the MME 151 is selected instead of the previously utilized MME 150. Accordingly, the control plane module 162 of the MBMS-GW 160 re-establishes the control plane sessions of the MBMS sessions with the MME 151 by sending the session start request 419 to the MME 150, to which the MME 150 responds with the session start response 420. By utilizing the restored context information, the session start request 419 is sent with the same parameters as initially utilized when establishing the MBMS sessions.

The MME 150 then proceeds by sending a session start request 421 to the participating MCE 114, and the MCE 114 responds with a session start response 422. Since the session start request 421 is based on the restored context information, it indicates the same session identifier as initially utilized when establishing the MBMS sessions. Accordingly, the MCE 114 can re-associate the ongoing user plane sessions with the re-established control plane sessions with the MME 151, as indicated by step 422. Here, it should be noted that between the MME 150 and the MCE 114 the TMGI, the Absolute-Time-ofMBMS-Data, and optionally a Flow Identifier may be utilized as the session identifier.

Figure 5:
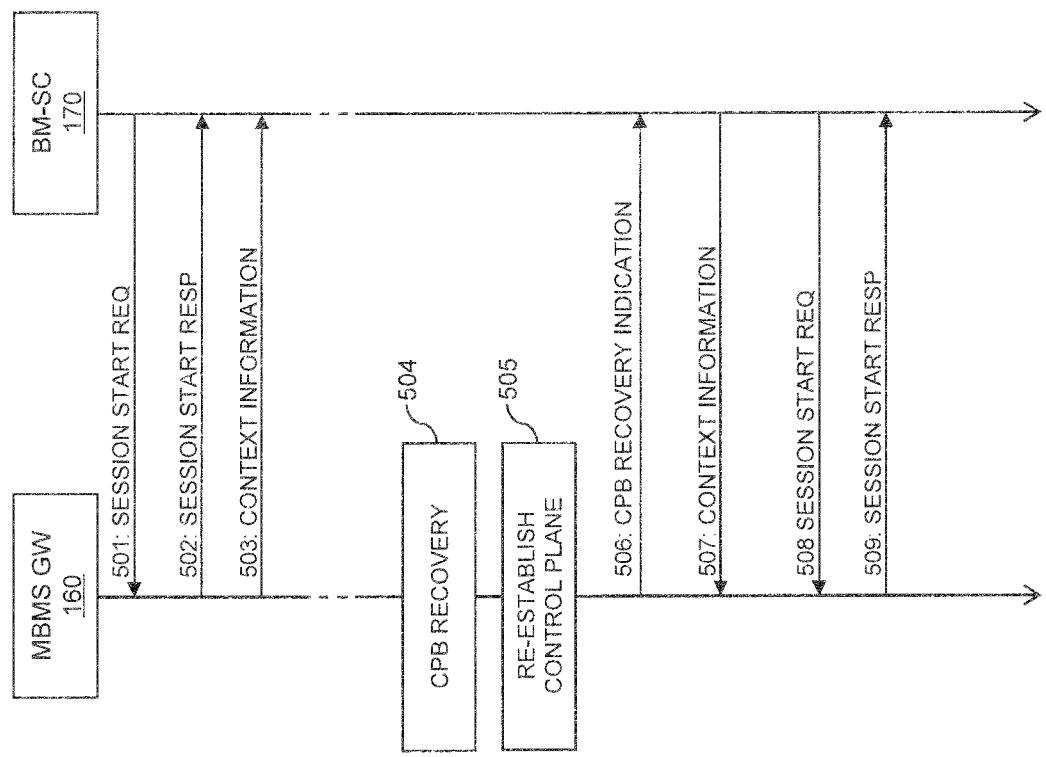
FIG. 5 schematically illustrates exemplary processes according to an embodiment of the invention, which may be utilized for restoring context information after recovery from a failure of the control plane module of the gateway node.

FIG. 5 shows an example of a process which may be utilized for restoring the context information. Similar to the processes of FIGS. 2-4, the processes of FIG. 5 assume that the context information of the control plane session in the MBMS-GW 160 is saved in an external storage in the BM-SC 170, such as the context repository 175, for later restoration after a failure of the control plane module 162 of the MBMS-GW 160.

In the processes of FIG. 5, establishment of the control plane session is initiated by a session start request 501 from the BM-SC 501 to the MBMS-GW 160, e.g., similar to the session start request 201 of FIG. 2. The control plane module 162 of the MBMS-GW 160 receives the session start request 501, creates the MBMS bearer context, and responds with a session start response 502.

As further illustrated, the control plane module 162 of the MBMS-GW 160 indicates context information 503 of the MBMS bearer context to the BM-SC 170, where it is persistently stored for the case of a later restoration procedure. The context information 503 may include a session identifier of the MBMS session, the C-TEID, and the source IP address and IP multicast destination address for the M1 interface. As explained in connection with FIG. 2, the context information 503 may be indicated as a part of the session start response 502, e.g., in one or more correspondingly defined AVPs. However, also a separate message could be utilized for indicating the context information 503 to the external storage in the BM-SC 170.

If at a later point of time the control plane module 162 of the MBMS-GW 160 recovers from a failure, as indicated by step 504, the control plane module 162 initiates re-establishment of the control plane for ongoing MBMS transmissions, as indicated by step 505.

To restore the control plane session to a state before the failure, the control plane module 162 of the MBMS-GW 160 obtains the saved context information from the external storage in the BM-SC 170. In the processes of FIG. 5, this is achieved by the control plane module 162 of the MBMS-GW 160 sending a CPB recovery indication 506 to the BM-SC 170. The BM-SC 170 receives the CPB recovery indication 506 and responds with the previously saved context information 507.

In the process of FIG. 5, the re-establishment of the control plane session further involves sending a session start request 508 from the BM-SC 170 to the control plane module 162 of the MBMS-GW 160, to which the control plane module 162 of the MBMS-GW 160 responds with a session start response 509. Such session start request 508 is typically sent with respect to each control plane session which was handled by the failed control plane module 162.

Similar to the processes of FIGS. 3 and 4, the CPB recovery indication 506 may be included in a CER message from the control plane module 162 of the MBMS-GW 160 to the BM-SC 170, e.g., in the form of the CPB restart counter and the restart counter AVPs. However, also other ways of indicating the recovery of the control plane module 162 and the nature of the underlying failure may be utilized, e.g., one or more other AVPs or a dedicated message.

The saved context information 507 may be indicated as a part of the session start request 508, e.g., by including one or more corresponding AVPs, similar to the processes of FIGS. 3 and 4. However, also a separate message could be utilized for indicating the saved context information 507 to the control plane module 162 of the MBMS-GW 160.

Figure 6:
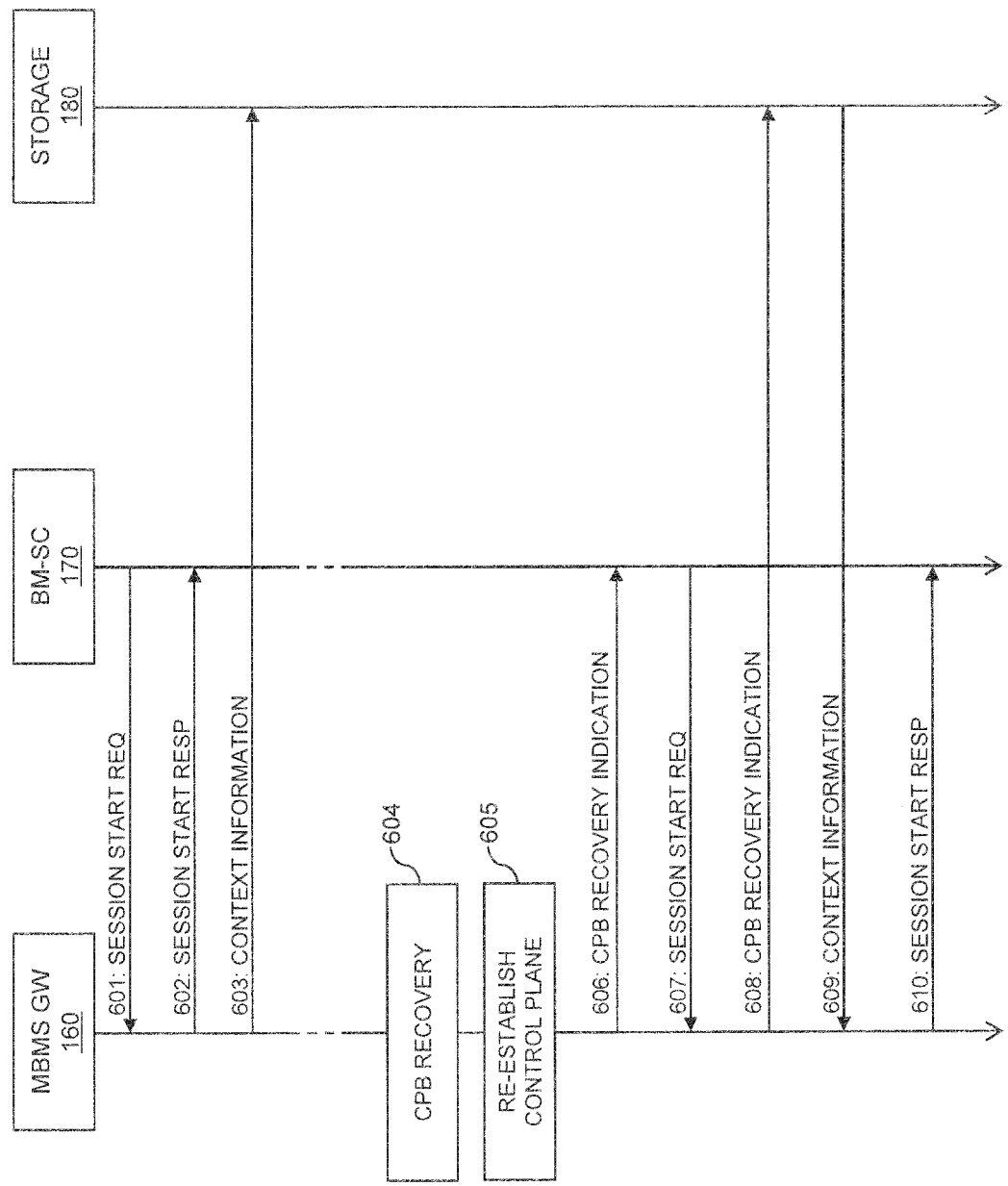
FIG. 6 schematically illustrates further exemplary processes according to an embodiment of the invention, which may be utilized for restoring context information after recovery from a failure of the control plane module of the gateway node.

FIG. 6 shows an example of a process which may be utilized for restoring the context information in scenarios where the context information of the control plane session in the MBMS-GW 160 is saved in an external storage in another node than the BM-SC 170, such as in a dedicated context repository, from where it can later be retrieved for restoration after a failure of the control plane module o162 of the MBMS-GW 160.

In the processes of FIG. 6, establishment of the control plane session is initiated by a session start request 601 from the BM-SC 601 to the MBMS-GW 160, e.g., similar to the session start request 201 of FIG. 2. The control plane module 162 of the MBMS-GW 160 receives the session start request 601, creates the MBMS bearer context, and responds with a session start response 602.

As further illustrated, the control plane module 162 of the MBMS-GW 160 indicates context information 603 of the MBMS bearer context to the external storage 180, where it is persistently stored for the case of a later restoration procedure. The context information 603 may include a session identifier of the MBMS session, the C-TEID, and the source IP address and IP multicast destination address for the M1 interface. Depending on the node which includes the external storage 180, an existing message defined for an interface between the MBMS-GW 160 and the node including the external storage 180 may be supplemented by the context information 603, or a separate message may be defined for indicating the context information 603 to the external storage 180.

If at a later point of time the control plane module 162 of the MBMS-GW 160 recovers from a failure, as indicated by step 604, the control plane module 162 initiates re-establishment of the control plane for ongoing MBMS transmissions, as indicated by step 605. In the process of FIG. 6, the re-establishment of the control plane involves sending a CPB recovery indication 606 to the BM-SC 170, to which the BM-SC 170 reacts by sending a session start request 607. Such session start request 508 is typically sent with respect to each control plane session which was handled by the failed control plane module 162.

To restore the control plane session to a state before the failure, the control plane module 162 of the MBMS-GW 160 obtains the saved context information from the external storage 180. In the processes of FIG. 6, this is achieved by the control plane module 162 of the MBMS-GW 160 sending a CPB recovery indication 608 to the external storage 180. The external storage 180 receives the CPB recovery indication 608 and responds with the previously saved context information 609.

The control plane module 162 of the MBMS-GW 160 may then proceed with the re-establishment of the control plane session by responding with a session start response 610 to the session start request 607 from the BM-SC 170.

The CPB recovery indication 606 may be included in a CER message from the control plane module 162 of the MBMS-GW 160 to the BM-SC 170, e.g., in the form of the CPB restart counter and the restart counter AVPs. However, also other ways of indicating the recovery of the control plane module 162 and the nature of the underlying failure may be utilized, e.g., one or more other AVPs or a dedicated message. Similarly, also the CPB recovery indication 608 may be provided by supplementing an existing message on the interface between the MBMS-GW 160 and the node including the external storage 180 with one or more corresponding AVPs, e.g., in the form of the CPB restart counter and the restart counter AVPs. However, also other ways of indicating the recovery of the control plane module 162 and the nature of the underlying failure may be utilized, e.g., one or more other AVPs or a dedicated message.

The saved context information 609 may be indicated by supplementing an existing message defined for an interface between the MBMS-GW 160 and the node including the external storage 180 with the saved context information 609. Alternatively, a separate message may be defined for transmitting the saved context information from the external storage 180 to the control plane module 162 of the MBMS-GW 160.

Figure 7:
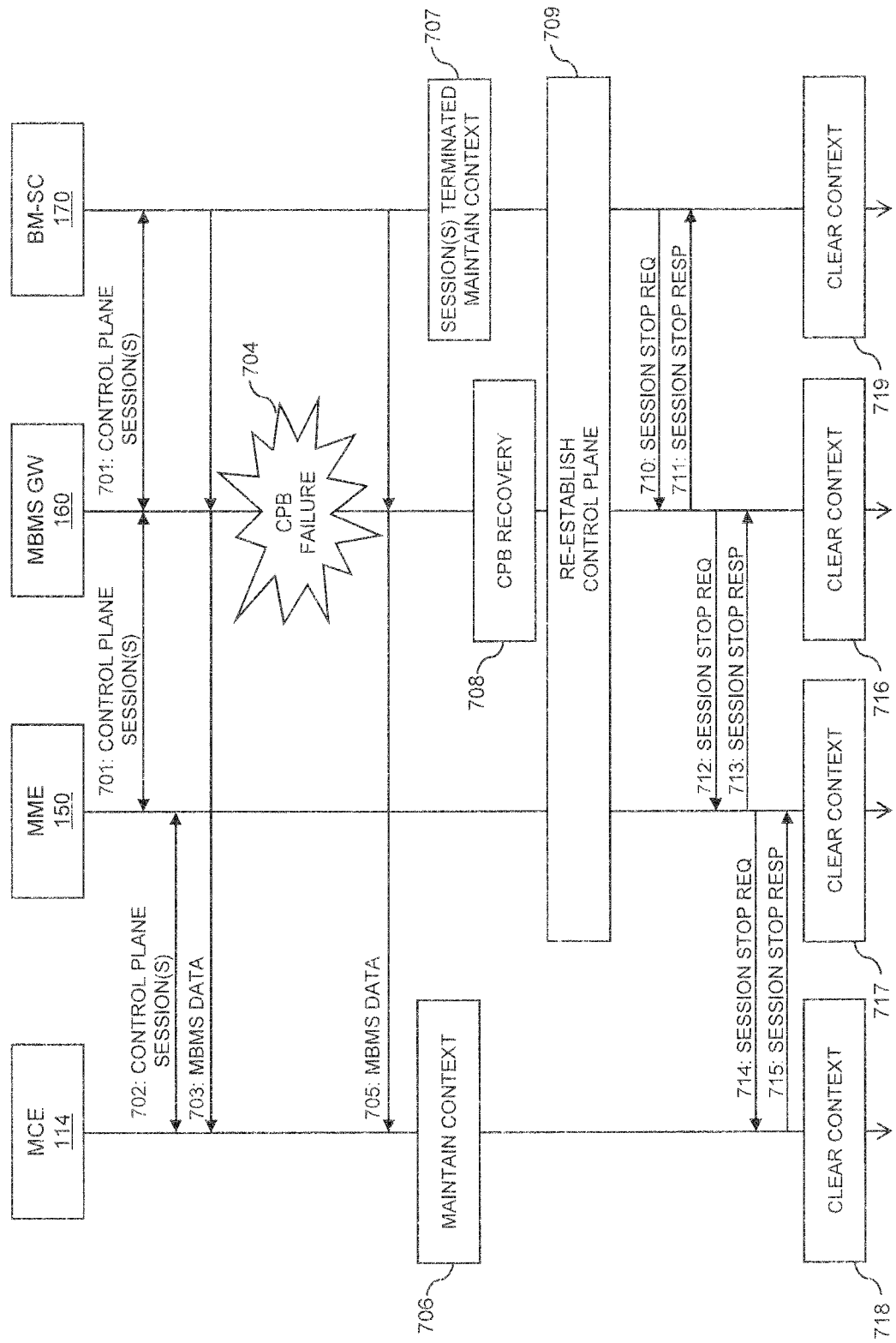
FIG. 7 schematically illustrates exemplary processes according to an embodiment of the invention, which may be applied when multicast transmissions are terminated during failure of the control plane of the gateway node.

FIG. 7 refers to a scenario in which the control plane module 162 fails and MBMS sessions established before failure of the control plane module 162 are terminated before recovery of the control plane module 162 from the failure.

As illustrated, one or more control plane sessions 701 associated with corresponding MBMS sessions are established between the BM-SC 170, the MBMS-GW 160 and the MME 150, and associated control plane sessions 702 are established between the MME 150 and the MCE 114. Further, MBMS data 703 associated with the MBMS sessions are being transmitted in ongoing user plane sessions from the BM-SC 170 via the MBMS-GW 160 to the MCE 114.

In this situation, a failure of the control plane module 162 of the MBMS-GW 160 occurs, as illustrated by 704.

After the failure, the control plane module 162 stops sending messages to the MME 150 on the Sm interface. Since the user plane module 164 of the MBMS-GW 160 is unaffected by the failure, transmission of MBMS data continues on the SGi-mb interface between the BM-SC 170 and the MBMS-GW 160 and on the M1 interface between the MBMS-GW 160 and the MCE 114, as illustrated by 705. Accordingly, the user plane sessions associated with the MBMS sessions are maintained, while the control plane sessions associated with the MBMS sessions are interrupted at the MBMS-GW 160.

In the processes of FIG. 7, it is assumed that the BM-SC 170 terminates the MBMS sessions during the failure of the control plane module 162 of the MBMS-GW 160. At that point, the BM-SC 170 stops performing MBMS transmissions towards the MBMS-GW 160 but temporarily maintains the context of these MBMS sessions, as indicated by step 707. Accordingly, the BM-SC 170 no longer delivers MBMS data towards the MBMS-GW 160 via the SGi-mb interface, and the MBMS-GW 160 no longer multicasts data towards the MCE 114 via the M1 interface, i.e., the user plane sessions through the user plane module 164 of the MBMS-GW 160 are discontinued.

At some later point, the control plane module 162 of the MBMS-GW 160 recovers from the failure, as indicated by step 708. At that time, there may still be remaining parts of the previously established MBMS sessions in some of the involved nodes. For example, the MCE 114 may continue to provide resources for the MBMS sessions, although the MBMS transmissions have been discontinued. Further, there may still be control plane sessions between the MME 150 and the MCE 114.

In the scenario of FIG. 7, it is assumed that the control plane of the terminated MBMS sessions is re-established, as indicated by step 709. This may involve procedures as for example explained in connection with FIG. 3, in particular sending session start requests on the basis of restored context information of the control plane module 162 of the MBMS-GW 160.

After re-establishing the control plane, the BM-SC 170 continues by initiating a termination procedure towards the MBMS-GW 160, the MME 150, and the MCE 114. In the illustrated example, the termination procedure involves that the BM-SC 170 sends a session stop request 710 to the control plane module 162 of the MBMS-GW 160, to which the control plane module 162 of the MBMS-GW 160 responds with a session stop response 711, that the control plane module 162 of the MBMS-GW 160 sends a session stop request 712 to the MME 150, to which the MME 150 responds with a session stop response 713, and that the MME 150 sends a session stop request 714 to MCE 114, to which the MCE 114 responds with a session stop response 715. Each of these nodes reacts to the received session stop request 710, 712, 714 by clearing the MBMS bearer context and releasing the associated resources, as illustrated by steps 716, 717, and 718. Further, then also the BM-SC 170 may clear the context of the terminated MBMS sessions.

Figure 8:
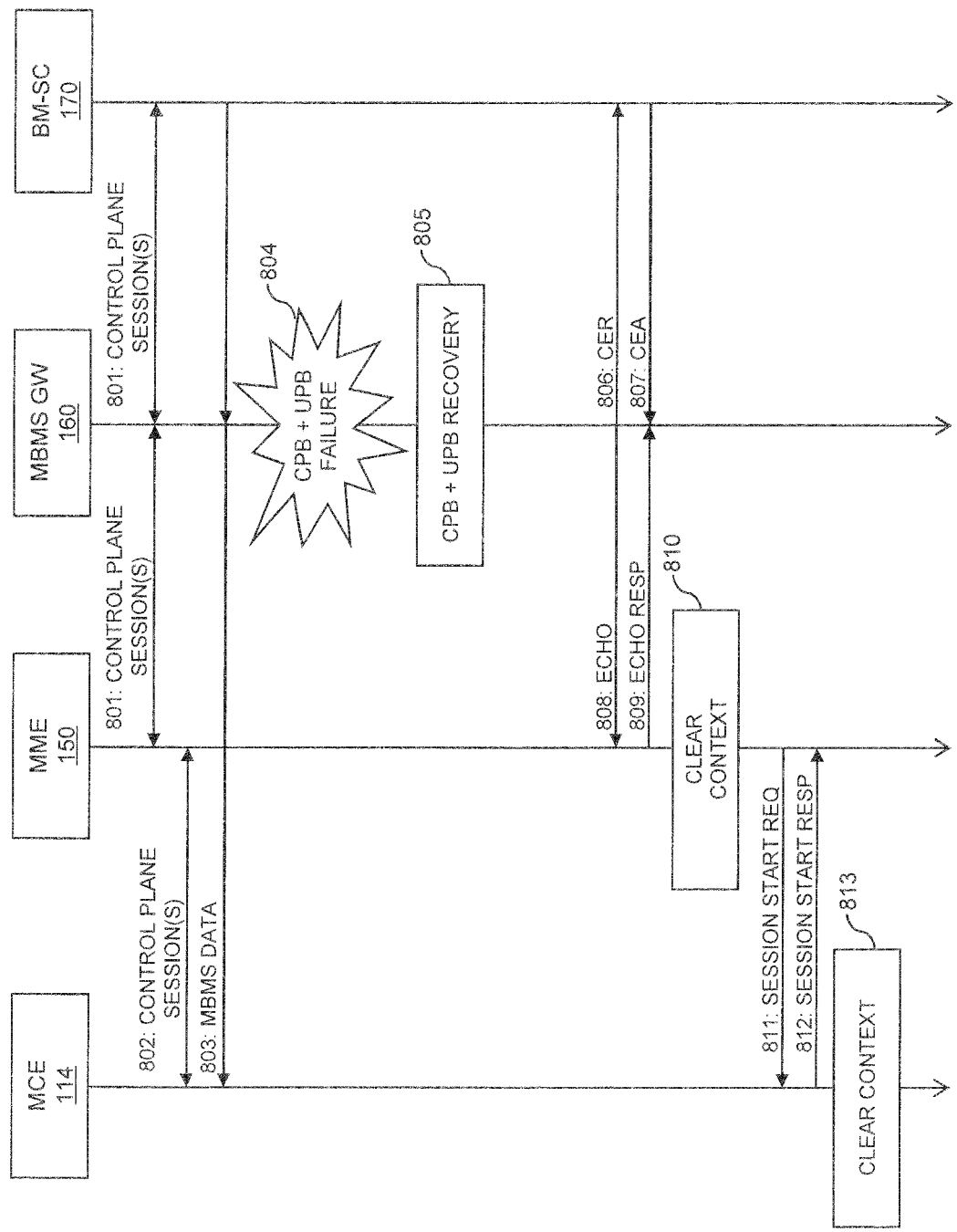
FIG. 8 schematically illustrates exemplary processes according to an embodiment of the invention, which may be applied when recovery from a failure of the control plane module occurs when another node still maintains a context of control plane sessions established before the failure.

FIG. 8 refers to a scenario in which both the control plane module 162 and the user plane module 164 of the MBMS-GW 160 fail, and illustrates differences in the reaction of the other nodes as compared to the isolated failures as assumed in the previously illustrated scenarios.

As illustrated, one or more control plane sessions 801 associated with corresponding MBMS sessions are established between the BM-SC 170, the MBMS-GW 160 and the MME 150, and associated control plane sessions 802 are established between the MME 150 and the MCE 114. Further, MBMS data 803 associated with the MBMS sessions are being transmitted in ongoing user plane sessions from the BM-SC 170 via the MBMS-GW 160 to the MCE 114.

In this situation, a failure of the control plane module 162 and the user plane module 164 of the MBMS-GW 160 occurs, as illustrated by 804.

At some point, the control plane module 162 and the user plane module 164 of the MBMS-GW 160 recover from the failure, as indicated by step 805.

The control plane module 162 and the user plane module 164 of the MBMS-GW 160 then start re-establishing the control plane and user plane of the MBMS sessions. For this purpose, the control plane module 162 of the MBMS-GW 160 reconnects to the BM-SC 170, as illustrated by messages 806 and 807. Reconnecting to the BM-SC 170 involves transmitting a CER message 806 from the control plane module 162 of the MBMS-GW 160 to the BM-SC 170 and transmitting a CEA message 807 from the BM-SC 170 to the control plane module 162 of the MBMS-GW 160.

Further, the control plane module 162 of the MBMS-GW 160 reconnects to the MME 150, as illustrated by messages 808 and 809. Reconnecting to the MME 150 involves transmitting a GTP-C Echo Request 808 from the control plane module 162 of the MBMS-GW 160 to the MME 150 and transmitting a GTP-C Echo Response 809 from the MME 150 to the control plane module 160 of the MBMS-GW 160.

For the reconnection procedures over the SGmb interface to the BM-SC 170 and over the Sm interface to the MME 150 the control plane module 162 does not increase the value of the CPB restart counter, because the failure did not relate to the control plane module 162 only, but also to the user plane module. The value of the CPB restart counter is indicated by the CPB restart counter AVP in messages transmitted on the SGmb interface, or by the CPB restart counter IE in messages transmitted on the Sm interface. However, the control plane module 162 also increases the value of the restart counter. The value of the restart counter is indicated by the restart counter AVP in messages transmitted on the SGmb interface, or by the restart counter IE in messages transmitted on the Sm interface. For example, the restart counter AVP and the CPB restart counter AVP may be indicated in the CER message 806 transmitted from the control plane module 162 of the MBMS-GW 160 to the BM-SC 170. Further, the restart counter IE and the CPB restart counter IE may be indicated in the GTP-C Echo Request message 808 transmitted from the control plane module 162 of the MBMS-GW 160 to the MME 150.

By identifying the maintaining of the CPB restart counter and the increase of the restart counter on the basis of the received messages, the respective other node, i.e., the MME 150 or BM-SC 170 may identify that the MBMS-GW 160 recovered from an overall failure of the both the control plane module 162 and the user plane module 164 and react accordingly. For example, the BM-SC 170 may initiate re-establishment of the interrupted control plane sessions and user plane sessions. Further, the MME 150 may react by clearing the MBMS bearer context, as indicated by step 810, and initiating a termination procedure towards the MCE 114. As illustrated, the termination procedure involves that the MME 150 sends a session stop request 811 to MCE 114, to which the MCE 114 responds with a session stop response 812. The MME 114 reacts to the received session stop request 811 by clearing the MBMS bearer context and releasing the associated resources, as illustrated by steps 813.

After that, the MBMS sessions may be newly established by the BM-SC 170, e.g., using procedures as illustrated in FIG. 2.

Figure 9:
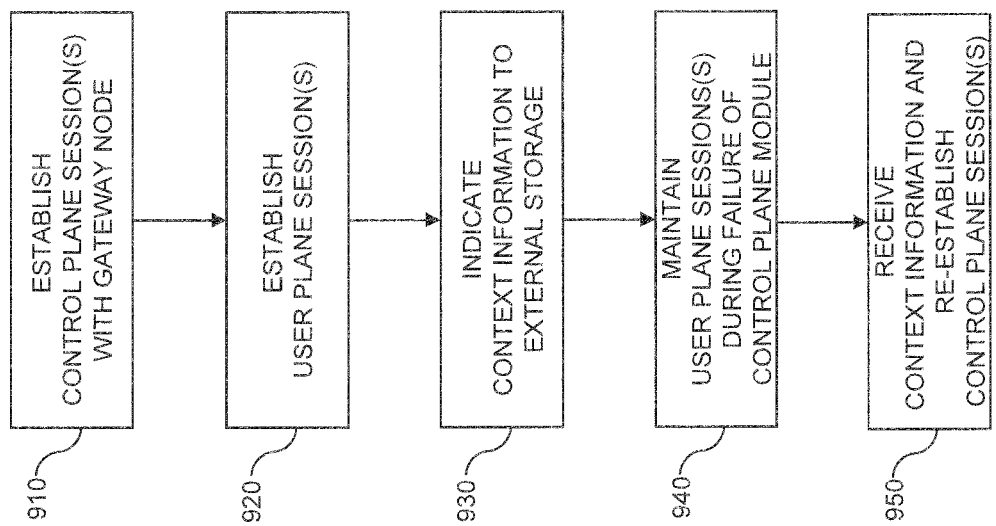
FIG. 9 shows a flowchart for illustrating a method of managing multicast transmissions according to an embodiment of the invention.

FIG. 9 shows a flowchart for illustrating a method of managing multicast transmissions in a cellular network. The method of FIG. 9 may be used for implementing the above-described concepts in a gateway node of the cellular network. The multicast transmissions may be MBMS transmissions and the gateway node may for example be an MBMS-GW of an MBMS architecture, such as the MBMS-GW 160. In the method of FIG. 9, a modular architecture of the gateway node is assumed, in which the gateway node includes a control plane module and a user plane module, such as the control plane module 162 and the user plane module 164. If a processor based implementation of the gateway node is used, the steps of the method may be performed by one or more processors of the gateway node, e.g., one or more processors of the control plane module and one or more processors of the user plane module. For this purpose, the processor(s) may execute correspondingly configured program code. Further, at least some of the corresponding functionalities may be hardwired in the processor(s).

At step 910, the control plane module the gateway node establishes one or more control plane sessions associated with the multicast transmissions.

At step 920, the user plane module of the gateway node establishes one or more user plane sessions associated with the multicast transmissions.

At step 930, the control plane module of the gateway node indicates context information of the control plane session(s) to an external storage. The external storage may be located in a further node of the cellular network, e.g., in a service layer node or a dedicated storage node. For example such external storage may be located in a BM-SC of the MBMS architecture. An example of such external storage is the above-mentioned context repository 175. In some scenarios the external storage may also be implemented as a further module of the gateway node, i.e., be external with respect to the control plane module, but internal with respect to the gateway node. The external storage has the purpose of storing the context information and acting as a backup location for the context information which is maintained by the control plane module of the gateway node.

For each of the control plane sessions, the context information may include an identifier of the control plane session, such as the above-mentioned session identifier. Further, the context information may include a tunnel endpoint identifier of the gateway node, such as the above-mentioned C-TEID for each of the control plane sessions. Further, the context information may include a source network address associated the multicast transmissions, in particular a source network address assigned to the gateway node for forwarding the multicast transmission towards multiple RAN nodes performing the multicast transmissions. The source network address may be an IP version 4 address or an IP version 6 address. Further, the context information may include a multicast destination network address associated with the multicast transmissions, in particular a multicast destination address assigned to multiple RAN nodes performing the multicast transmissions. The multicast destination network address may be an IP version 4 multicast address or an IP version 6 multicast address.

At step 940, during a failure of the control plane module of the gateway node, the user plane module of the gateway node maintains the user plane session(s). This may involve continuing forwarding of multicast transmissions towards multiple RAN nodes performing the multicast transmissions.

At step 950, after recovery from the failure of the control plane module of the gateway node, the control plane module of the gateway node receives the context information from the external storage and re-establishes at least one of the control plane session(s) on the basis of the received context information.

In some implementations, the control plane module of the gateway node may send an indication of the recovery to a further node of the cellular network. In response to the indication, the control plane module of the gateway node may re-establish at least one of the control plane sessions with this further node. For example, such indication may be sent to a service layer node, e.g., a BM-SC of an MBMS architecture, to cause the service layer node to request re-establishment of the at least one control plane session. Such indication may also be sent to a control node, such as an MME or SGSN of an MBMS architecture, to cause the control node to adapt its behaviour with respect to requests for establishing control plane sessions with the gateway node. The indication of the recovery may indicate that the control plane module of the gateway node failed while the user plane module of the gateway node remained operative. This may for example be achieved by the indicating the above-mentioned CPB restart counter value, optionally in connection with the restart counter value.

In some implementations, the further node with which the at least one control plane session is re-established may include the external storage, e.g., as explained above for the BM-SC 170 which includes the context repository 175. In such cases, the control plane module of the gateway node may receive the context information in a control message for re-establishing the at least one control plane session, such as in the above-mention session start request 312, 412, or 810.

In some scenarios, if one or more of the multicast transmissions were terminated during the failure of the control plane module of the gateway node, the control plane module of the gateway node re-establishes the associated control plane session to allow for a proper termination procedure, e.g., as explained in connection with FIG. 7.

Figure 10:
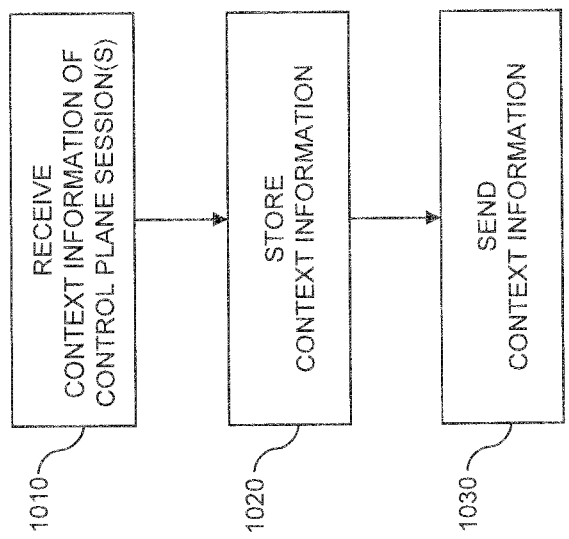
FIG. 10 shows a flowchart for illustrating a further method of managing multicast transmissions according to an embodiment of the invention.

FIG. 10 shows a flowchart for illustrating a method of managing multicast transmissions in a cellular network. The method of FIG. 10 may be used for implementing the above-described concepts in a node of the cellular network. The node may for example be a service layer node for handling the multicast transmissions, e.g., a BM-SC, such as the BM-SC 170, or some other node. If a processor based implementation of the node is used, the steps of the method may be performed by one or more processors of the node. For this purpose, the processor(s) may execute correspondingly configured program code. Further, at least some of the corresponding functionalities may be hardwired in the processor(s). In the method of FIG. 10, a modular architecture of a gateway node involved in handling the multicast transmissions is assumed, in which the gateway node includes a control plane module and a user plane module, such as the control plane module 162 and the user plane module 164.

At step 1010, the node receives, from the control plane module of the gateway node, context information of one or more control plane sessions associated with the multicast transmissions and established by the control plane module of the gateway node.

For each of the control plane sessions, the context information may include an identifier of the control plane session, such as the above-mentioned session identifier. Further, the context information may include a tunnel endpoint identifier of the gateway node, such as the above-mentioned C-TEID for each of the control plane sessions. Further, the context information may include a source network address associated the multicast transmissions, in particular a source network address assigned to the gateway node for forwarding the multicast transmission towards multiple RAN nodes performing the multicast transmissions. The source network address may be an IP version 4 address or an IP version 6 address. Further, the context information may include a multicast destination network address associated with the multicast transmissions, in particular a multicast destination address assigned to multiple RAN nodes performing the multicast transmissions. The multicast destination network address may be an IP version 4 multicast address or an IP version 6 multicast address.

At step 1020, the stores the received context information. Accordingly, the context information is saved for utilization in a later restoration procedure.

At step 1030, after recovery from a failure of the control plane module of the gateway node, the node sends the context information to the control plane module of the gateway node.

In some scenarios, at least a part of the control sessions may be established between the node and the control plane module of the gateway node. This may for example be the case if the node used for external storage of the context information also acts a service layer node for the multicast transmissions, such as in case of the BM-SC 170. In such scenarios, the node may re-establish the at least one of control plane session with the control plane module of the gateway node, e.g., in response to receiving an indication of the recovery from the control plane module of the gateway node. An example of such indication of the recovery is the CER message 310, 410, or 808. In such scenarios, the node may also send the context information in a control message for re-establishing the at least one control plane session. An example of such control message is the session start request 312, 412, or 810. In some scenarios, if one or more of the multicast transmissions were terminated during the failure of the control plane module of the gateway node, the node does not re-establish the associated control plane session, e.g., as explained in connection with FIG. 7.

Figure 11:
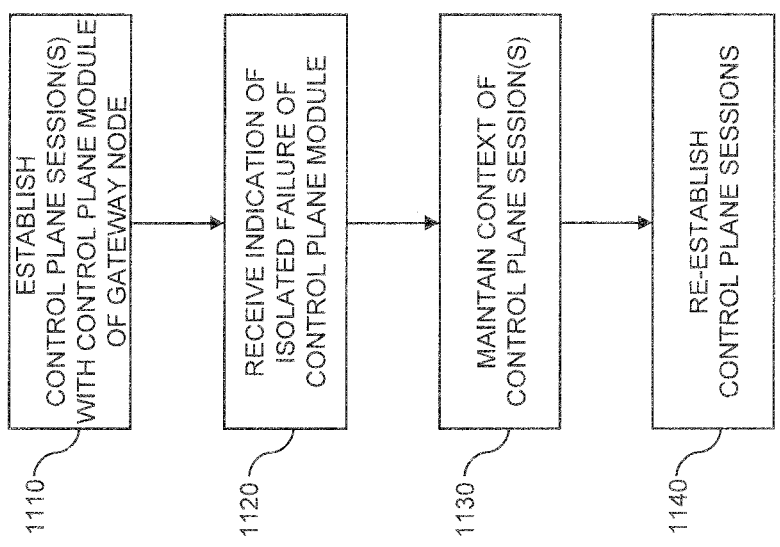
FIG. 11 shows a flowchart for illustrating a further method of managing multicast transmissions according to an embodiment of the invention.

FIG. 11 shows a flowchart for illustrating a method of managing multicast transmissions in a cellular network. The method of FIG. 11 may be used for implementing the above-described concepts in a control node of the cellular network. The control node may for example be an MME, such as the MME 150, or an SGSN, such as the SGSN 140. If a processor based implementation of the control node is used, the steps of the method may be performed by one or more processors of the control node. For this purpose, the processor(s) may execute correspondingly configured program code. Further, at least some of the corresponding functionalities may be hardwired in the processor(s). In the method of FIG. 11, a modular architecture of a gateway node involved in handling the multicast transmissions is assumed, in which the gateway node includes a control plane module and a user plane module, such as the control plane module 162 and the user plane module 164.

At step 1110, the control node establishes one or more control plane sessions with the control plane module the gateway node.

At step 1120, the control node receives an indication that a failure of the control plane module of the gateway node occurred while a user plane module remained operative. This may for example be achieved by the indicating the above-mentioned CPB restart counter value, optionally in connection with the restart counter value.

At step 1130, in response to the indication of step 1120, the control node clears a context of the control plane session(s). This is accomplished only locally, i.e., without providing a corresponding indication to one or more further nodes of the cellular network. Such further nodes may for example be RAN nodes performing the multicast transmissions. During the failure, the RAN nodes may maintain one or more user plane sessions with the user plane module of the gateway node.

In some scenarios, the control node may also receive a further indication that both the control plane module and the user plane module of the gateway node failed. In such cases, the control node may react by clearing the context of the control plane session(s) and indicate termination of the control plane session(s) to one or more further nodes of the cellular network, e.g., by initiating a termination procedure as explained in connection with FIG. 8.

At step 1140, the control node may re-establish at least one of the control plane sessions. This may be accomplished on the basis of restored context information of the control plane sessions, e.g., restored using the method of FIG. 9. In some scenarios, if one or more of the multicast transmissions were terminated during the failure of the control plane module of the gateway node, the control node may re-establish the associated control plane session to allow for initiating a termination procedure, e.g., as explained in connection with FIG. 7.

The methods of FIGS. 9, 10, and 11 may also be combined in a system which includes a gateway node operating according to the method of FIG. 9 and one or more further nodes operating according to the method of FIG. 10 or 11. For example, in such system the gateway node could utilize a node operating according to the method of FIG. 10 as the external storage for saving the context information for restoration purposes. Further, in such system a a control node operating according to the method of FIG. 11 could co-operate with the gateway node for re-establishing the control plane sessions based on the restored context information.

Figure 12:
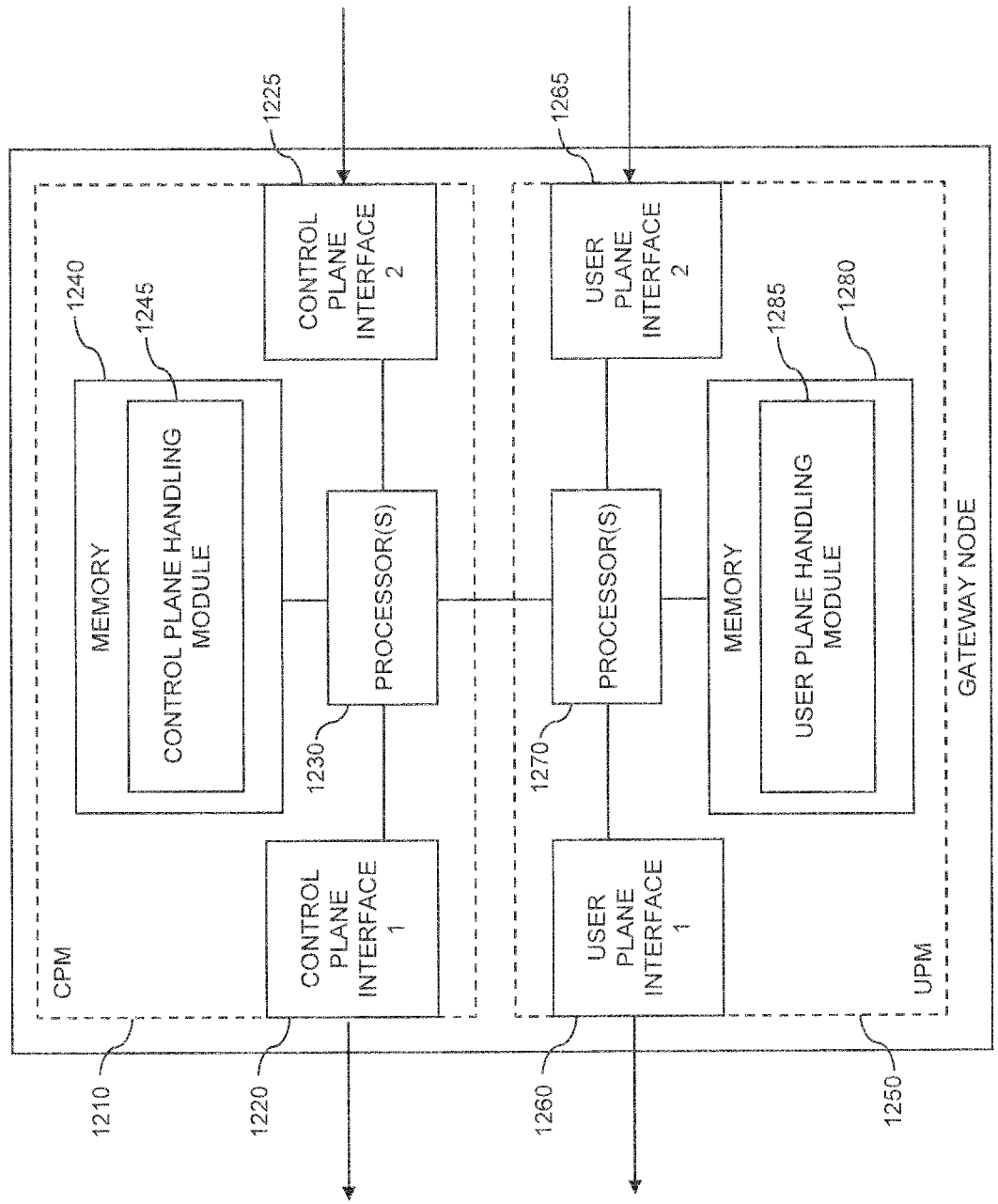
FIG. 12 schematically illustrates structures of a gateway node according to an embodiment of the invention.

FIG. 12 illustrates exemplary structures for implementing a gateway node which operates in accordance with the above-described concepts. For example, the illustrated structures may be used to implement an MBMS-GW, such as the MBMS-GW 160. As illustrated, the gateway node is implemented on the basis of a modular architecture and includes a control plane module (CPM) 1210 and a user plane module (UPM) 1250, e.g., corresponding to the above control plane module 162 and the above user plane module, respectively.

As illustrated, the control plane module 1210 may include a first control plane interface 1220 for establishing control plane sessions with a control node, such as an MME or SGSN. If the control node is an MME, the first interface 1220 may implement an Sm interface. If the control node is an SGSN, the control interface 1220 may implement an Sn interface. As further illustrated, the control plane module 1210 may include a second control plane interface 1225 for establishing control plane sessions with a service layer node, such as a BM-SC. For example, the second control plane interface 1225 may correspond to an SGmb interface.

Further, the control plane module 1210 includes one or more processor(s) 1230 coupled to the control plane interfaces 1220, 1225, and a memory 1240 coupled to the processor(s) 1230. The memory 1240 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1240 includes suitably configured program code modules to be executed by the processor(s) 1230 so as to implement the above-described functionalities of the control plane module, e.g., as illustrated by the method of FIG. 9. More specifically, the program code modules in the memory 1240 may include a control plane handling module 1245 so as to implement the above-described functionalities of establishing and handling control plane sessions, e.g., with respect to the re-establishment of the control plane sessions after an isolated failure of the control plane module 1210.

As further illustrated, the user plane module 1250 may include a first user plane interface 1260 for connecting to one or more RAN nodes, such as MCEs, eNBs, or NBs. The first user plane interface 1260 may be used for establishing one or more user plane sessions of multicast transmissions with the RAN nodes. If the gateway node is an MBMS-GW, the first user plane interface 1260 may for example implement an M1 interface of the MBMS-GW. Further, the user plane module 1250 may include a second user plane interface 1265. The second user plane interface 1265 may be used for receiving user plane traffic of the multicast transmissions from a service layer node, such a the BM-SC. If the gateway node is an MBMS-GW, the second user plane interface 1265 may for example implement an SGi-mb interface of the MBMS-GW.

As further illustrated, the user plane module 1250 includes one or more processor(s) 1270 coupled to the user plane interfaces 1260, 1265, and a memory 1280 coupled to the processor(s) 1270. The memory 1280 may include a ROM, e.g., a flash ROM, a RAM, e.g., a DRAM or SRAM, a mass storage, e.g., a hard disk or solid state disk, or the like. The memory 1280 includes suitably configured program code modules to be executed by the processor(s) 1280 so as to implement the above-described functionalities of the user plane module, e.g., as illustrated by the method of FIG. 9. More specifically, the program code modules in the memory 1280 may include a user plane handling module 1285 so as to implement the above-described functionalities of establishing and handling user plane sessions, e.g., with respect to maintaining user plane sessions during a failure of the control plane module 1210.

As further illustrated, the control plane module 1210 and the user plane module 1250 may be coupled to each other by an internal interface. Such internal interface may be utilized for coordinating the control plane functionalities implemented by the control plane module and the user plane functionalities implemented by the user plane module.

It is to be understood that the structures as illustrated in FIG. 12 are merely schematic and that the gateway node may actually include further components which, for the sake of clarity, have not been illustrated, e.g., further module, further interfaces, or further processors. Also, it is to be understood that the memories 1240 or 1280 may include further types of program code modules, which have not been illustrated, e.g., program code modules for implementing known functionalities of an MBMS-GW. In some implementations, also a computer program may be provided for implementing functionalities of the gateway node, e.g., in the form of a physical medium storing the program code modules to be stored in the memory 1240 or 1280 or by making such program code available for download or streaming.

Figure 13:
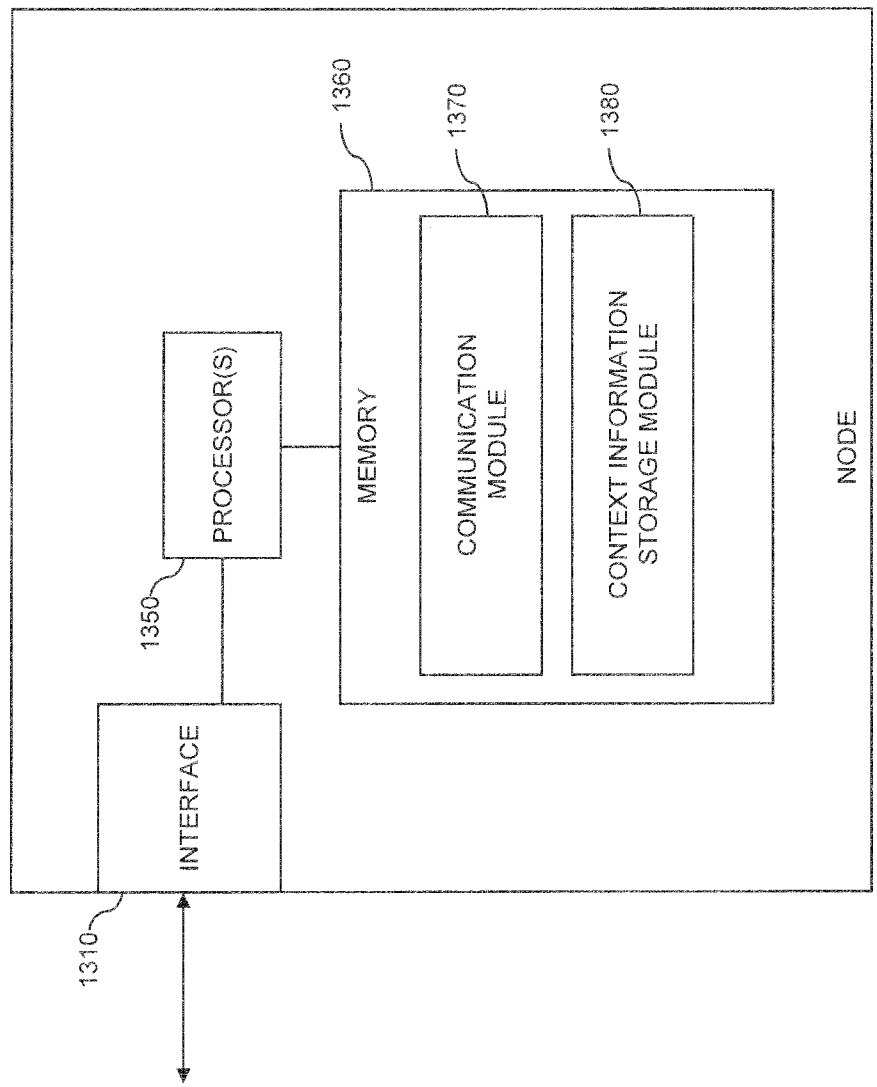
FIG. 13 schematically illustrates structures of a node according to an embodiment of the invention.

FIG. 13 illustrates exemplary structures for implementing a node of the cellular network which operates in accordance with the above-described concepts. For example, the illustrated structures may be used to implement a BM-SC, such as the BM-SC 170, or some other node acting as external storage for saving context information.

As illustrated, the node may include an interface 1310 for connecting to a gateway node of the cellular network. This gateway node may be an MBMS-GW of an MBMS architecture, such as the MBMS-GW 160. In some scenarios, the interface 1310 may also be used for establishing one or more control plane sessions with a control plane module of the gateway node. If the node is a BM-SC, the interface 1310 may correspond to an SGmb interface.

Further, the node includes one or more processor(s) 1350 coupled to the interface 1310, and a memory 1360 coupled to the processor(s) 1350. The memory 1360 may include a ROM, e.g., a flash ROM, a RAM, e.g., a DRAM or SRAM, a mass storage, e.g., a hard disk or solid state disk, or the like. The memory 1360 includes suitably configured program code modules to be executed by the processor(s) 1350 so as to implement the above-described functionalities of the node, e.g., as illustrated by the method of FIG. 10. More specifically, the program code modules in the memory 1360 may include a communication module 1370 so as to implement the above-described functionalities of receiving and transmitting context information of the control plane module of the gateway node. Further, the memory 1360 may include a context information storage module 1380 so as to implement the above-described functionalities of storing the context information for utilization in a later restoration procedure.

It is to be understood that the structures as illustrated in FIG. 13 are merely schematic and that the node may actually include further components which, for the sake of clarity, have not been illustrated, e.g., further interfaces or further processors. Also, it is to be understood that the memory 1360 may include further types of program code modules, which have not been illustrated, e.g., program code modules for implementing known functionalities of BM-SC or some other node of a cellular network. In some implementations, also a computer program may be provided for implementing functionalities of the node, e.g., in the form of a physical medium storing the program code modules to be stored in the memory 1360 or by making such program code available for download or streaming.

Figure 14:
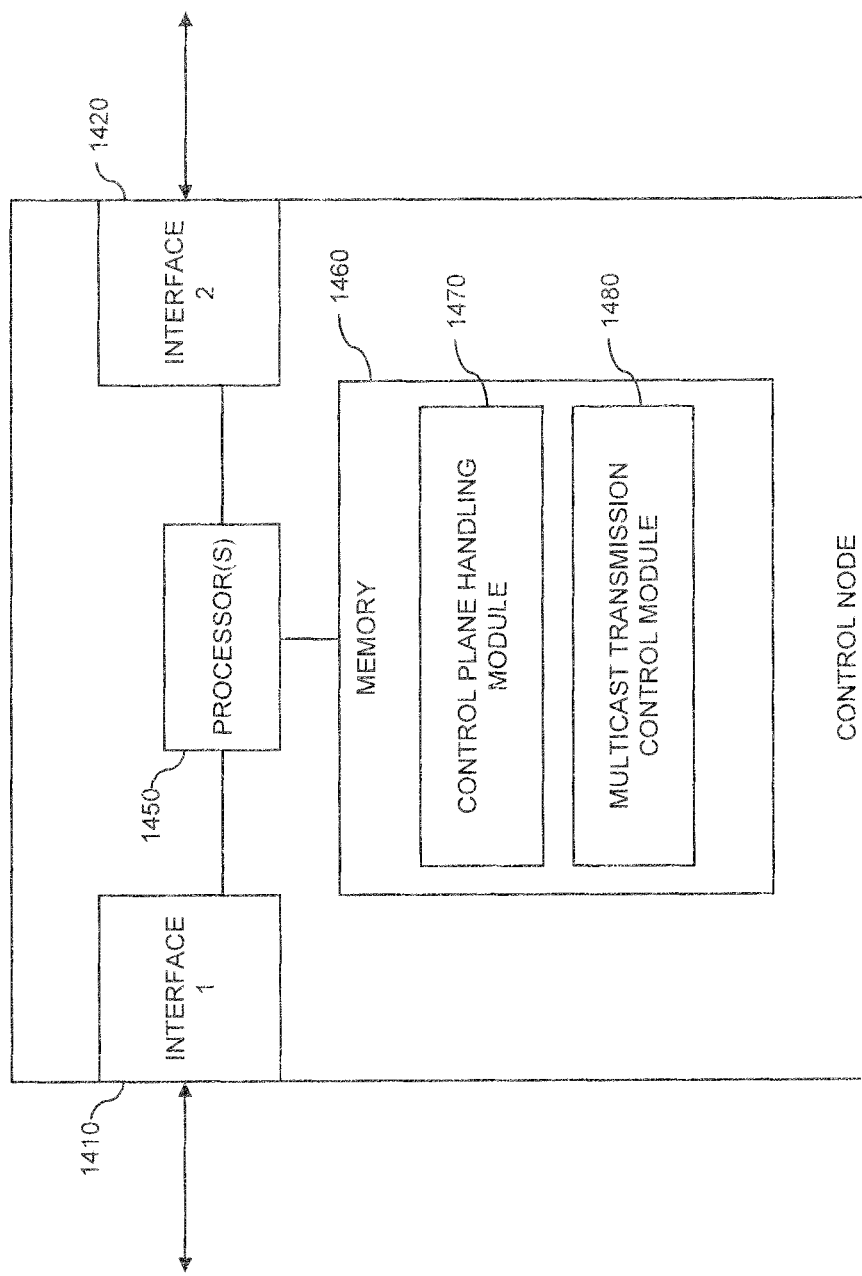
FIG. 14 schematically illustrates structures of a control node according to an embodiment of the invention.

FIG. 14 illustrates further exemplary structures for implementing a control node of the cellular network which operates in accordance with the above-described concepts. For example, the illustrated structures may be used to implement an MME, such as the MME 150, or an SGSN, such as the SGSN 140.

As illustrated, the control node may include a first interface 1410 for connecting to a gateway node of the cellular network. This gateway node may be an MBMS-GW of an MBMS architecture, such as the MBMS-GW 160. The first interface 1410 may be used for establishing one or more control plane sessions with a control plane module of the gateway node. If the control node is an MME, the first interface 1410 may implement an Sm interface of the MME. If the control node is an SGSN, the first interface 1410 may implement an Sn interface of the SGSN.

Further, the control node includes one or more processor(s) 1450 coupled to the interfaces 1410, 1420, and a memory 1460 coupled to the processor(s) 1450. The memory 1460 may include a ROM, e.g., a flash ROM, a RAM, e.g., a DRAM or SRAM, a mass storage, e.g., a hard disk or solid state disk, or the like. The memory 1460 includes suitably configured program code modules to be executed by the processor(s) 1450 so as to implement the above-described functionalities of the control node, e.g., as illustrated by the method of FIG. 11. More specifically, the program code modules in the memory 1460 may include a control plane handling module 1470 so as to implement the above-described functionalities of establishing and handling control plane sessions with the gateway node or with the RAN nodes, e.g., with respect to re-establishing control plane sessions after an isolated failure of the control plane module of the gateway node. Further, the memory 1460 may include a multicast transmission module for controlling multicast transmissions, e.g., through control plane and/or user plane functionalities.

It is to be understood that the structures as illustrated in FIG. 14 are merely schematic and that the control node may actually include further components which, for the sake of clarity, have not been illustrated, e.g., further interfaces or further processors. Also, it is to be understood that the memory 1460 may include further types of program code modules, which have not been illustrated, e.g., program code modules for implementing known functionalities of an MME, or SGSN. In some implementations, also a computer program may be provided for implementing functionalities of the control node, e.g., in the form of a physical medium storing the program code modules to be stored in the memory 1460 or by making such program code available for download or streaming.

As can be seen, the concepts as described above may be used for efficiently addressing an isolated failure of a control plane module of a gateway node handling multicast transmissions in a cellular network. In particular, the procedures may be utilized to restore the control plane functionalities affected by the failure while keeping a user plane of the multicast transmissions unaffected. Accordingly, the user plane traffic may continue even during the failure, which improves user experience.

It is to be understood that the examples and embodiments as explained above are merely illustrative and susceptible to various modifications. For example, the concepts may be applied in various kinds of cellular networks. Further, although the processes of FIGS. 2 to 8 focus on a scenario based on the LTE technology, these processes may be adapted for other technologies, e.g., the UMTS technology. Moreover, it is to be understood that the above concepts may be implemented by using correspondingly designed software to be executed by one or more processors of an existing device, or by using dedicated hardware.

The invention claimed is:

1. A method of managing multicast transmissions implemented by a gateway node in a cellular network, the gateway node including one or more processors of a control plane module and one or more processors of a user plane module, the method comprising:
   establishing, by the one or more processors of the control plane module, one or more control plane sessions associated with the multicast transmissions;
   establishing, by the one or more processors of the user plane module, one or more user plane sessions associated with the multicast transmissions;
   indicating, by the one or more processors of the control plane module, context information of each of the one or more control plane sessions to an external storage, wherein, for each of the one or more control plane sessions, the context information comprises a session identifier, and wherein the session identifier of each of the one or more control plane sessions allows distinguishing the context information of the one or more control plane sessions;
   maintaining, by the one or more processors of the user plane module during a failure of the control plane module, the one or more user plane sessions; and
   receiving, by the one or more processors of the control plane module after recovery from the failure of the control plane module, the context information from the external storage and re-establishing at least one of the one or more control plane sessions based on the received context information.

2. The method of claim 1, further comprising:
   sending, by the one or more processors of the control plane module, an indication of the recovery to a further node of the cellular network; and
   reestablishing, by the one or more processors of the control plane module in response to the indication, the at least one of the one or more control plane sessions with the further node.

3. The method of claim 1, wherein the context information is received in a control message for re-establishing the at least one of the one or more control plane sessions.

4. The method of claim 1, further comprising not re-establishing the control plane sessions associated with multicast transmissions that were terminated during the failure of the control plane module.

5. The method of claim 1, wherein, for each of the one or more control plane sessions, the context information further comprises a tunnel endpoint identifier of the gateway node.

6. The method of claim 1, wherein, for each of the one or more control plane sessions, the context information further comprises a source network address associated with the multicast transmissions.

7. The method of claim 1, wherein, for each of the one or more control plane sessions, the context information further comprises a multicast destination network address associated with the multicast transmissions.

8. A method of managing multicast transmissions in a cellular network, the method comprising a control node of the cellular network:
   establishing one or more control plane sessions associated with the multicast transmissions with a control plane module of a gateway node of the cellular network;
   receiving an indication that a failure of the control plane module of the gateway node occurred while a user plane module remained operative; and
   in response to the indication, locally clearing a context of the one or more control plane sessions, wherein locally clearing the context comprises deleting, by the control node, context information of the gateway node that is stored at the control node and releasing, by the control node, resources of the context information that are provided by the control node, wherein, for each of the one or more control plane sessions, the context information comprises a session identifier, and wherein the session identifier of each of the one or more control plane sessions allows distinguishing the context information of the one or more control plane sessions.

9. The method of claim 8, further comprising:
   the control node receiving a further indication that a failure of the control plane module and of the user plane module of the gateway node occurred; and
   in response to the further indication, the control node clearing the context of the one or more control plane sessions and indicating termination of the one or more control plane sessions to one or more further nodes of the cellular network.

10. The method of claim 9, wherein the one or more further nodes comprise radio access network nodes performing the multicast transmissions.

11. The method of claim 10, wherein, during the failure of the control plane module of the gateway node, the radio access network nodes maintain one or more user plane sessions with the user plane module of the gateway node.

12. The method of claim 8, further comprising the control node, after locally clearing the context, re-establishing at least one of the one or more control plane sessions with the control plane module of the gateway node.

13. A method of managing multicast transmissions in a cellular network, the method comprising a node of the cellular network:
   receiving, from a control plane module of a gateway node of the cellular network, context information of each of one or more control plane sessions associated with the multicast transmissions and established by the control plane module of the gateway node, wherein, for each of the one or more control plane sessions, the context information comprises a session identifier, and wherein the session identifier of each of the one or more control plane sessions allows distinguishing the context information of the one or more control plane sessions;
   storing the received context information; and
   after recovery from a failure of the control plane module of the gateway node, sending the context information to the control plane module of the gateway node.

14. The method of claim 13, further comprising the node re-establishing at least one of the one or more control plane sessions with the control plane module of the gateway node.

15. The method of claim 14, wherein the node re-establishes the at least one of the one or more control plane sessions in response to receiving an indication of the recovery from the failure of the control plane module of the gateway node.

16. The method of claim 14, wherein the node sends the context information in a control message for re-establishing the at least one of the one or more control plane sessions.

17. The method of claim 13, further comprising, for multicast transmissions which were terminated during the failure of the control plane module of the gateway node, the node not re-establishing the associated control plane session.

18. The method of claim 13, wherein, for each of the one or more control plane sessions, the context information further comprises a tunnel endpoint identifier of the gateway node.

19. The method of claim 13, wherein, for each of the one or more control plane sessions, the context information further comprises a source network address associated with the multicast transmissions.

20. The method of claim 13, wherein, for each of the one or more control plane sessions, the context information further comprises a multicast destination network address associated with the multicast transmissions.

21. A gateway node for multicast transmissions in a cellular network, the gateway node comprising:
   at least one interface configured for communication with one or more further nodes of the cellular network; and
   processing circuitry including one or more processors of a control plane module and one or more processors of a user plane module, wherein the processing circuitry is configured to:
      establish, by the one or more processors of the control plane module, one or more control plane sessions associated with the multicast transmissions, and
      establish, by the one or more processors of the user plane module, one or more user plane sessions associated with the multicast transmissions,
   wherein the one or more processors of the control plane module are configured to:
      indicate context information of each of the one or more control plane sessions to an external storage, wherein, for each of the one or more control plane sessions, the context information comprises a session identifier, and wherein the session identifier of each of the one or more control plane sessions allows distinguishing the context information of the one or more control plane sessions; and
      after recovery from a failure of the control plane module, receive the context information from the external storage and re-establish at least one of the one or more control plane sessions based on the received context information, and
   wherein the one or more processors of the user plane module are configured to maintain the one or more user plane sessions during the failure of the control plane module of the gateway node.

22. The gateway node of claim 21, wherein the one or more processors of the control plane module are configured to:
   send an indication of the recovery to a further node of the cellular network; and
   in response to the indication, re-establish the at least one of the one or more control plane sessions with the further node.

23. The gateway node of claim 22, wherein the further node comprises the external storage.

24. The gateway node of claim 23, wherein the one or more processors of the control plane module are configured to receive the context information in a control message for re-establishing the at least one of the one or more control plane sessions.

25. The gateway node of claim 21, wherein the one or more processors of the control plane module are configured to, for multicast transmissions which were terminated during the failure of the control plane module of the gateway node, not re-establish the associated control plane session.

26. The gateway node of claim 21, wherein, for each of the one or more control plane sessions, the context information further comprises a tunnel endpoint identifier of the gateway node.

27. The gateway node of claim 21, wherein, for each of the one or more control plane sessions, the context information further comprises a source network address associated with the multicast transmissions.

28. The gateway node of claim 21, wherein, for each of the one or more control plane sessions, the context information further comprises a multicast destination network address associated with the multicast transmissions.

29. A control node for a cellular network, the control node comprising:
at least one interface configured for communication with a gateway node of the cellular network; and
processing circuitry configured to:
establish one or more control plane sessions with a control plane module of the gateway node via the at least one interface;
receive an indication that a failure of the control plane module of the gateway node occurred while a user plane module of the gateway node remained operative; and
in response to the indication, locally clear a context of the one or more control plane sessions, wherein to locally clear the context, the processing circuitry is configured to delete context information of the gateway node that is stored at the control node and release resources of the context information that are provided by the control node, wherein, for each of the one or more control plane sessions, the context information comprises a session identifier, and wherein the session identifier of each of the one or more control plane sessions allows distinguishing the context information of the one or more control plane sessions.

30. The control node of claim 29, wherein the processing circuitry is configured to:
receive a further indication that a failure of the control plane module and of the user plane module of the gateway node occurred; and
in response to the further indication, clear the context of the one or more control plane sessions and indicate termination of the one or more control plane sessions to one or more further nodes of the cellular network.

31. The control node of claim 30, wherein the one or more further nodes comprise radio access network nodes performing the multicast transmissions.

32. The control node of claim 31, wherein, during the failure of the control plane module of the gateway node, the radio access network nodes maintain one or more user plane sessions with the user plane module of the gateway node.

33. The control node of claim 29, wherein the processing circuitry is configured to, after clearing the context, re-establish at least one of the one or more control plane sessions with the control plane module of the gateway node.

34. A node for a cellular network, the node comprising:
at least one interface configured for communication with a gateway node of the cellular network;
processing circuitry; and
memory containing instructions executable by the processing circuitry whereby the node is operative to:
receive, from a control plane module of the gateway node, context information of each of one or more control plane sessions associated with multicast transmissions in the cellular network and established by the control plane module of the gateway node, wherein, for each of the one or more control plane sessions, the context information comprises a session identifier, and wherein the session identifier of each of the one or more control plane sessions allows distinguishing the context information of the one or more control plane sessions;
store the received context information in the memory; and
after recovery from a failure of the control plane module of the gateway node, send the context information to the control plane module of the gateway node.

35. The node of claim 34, wherein the instructions are such that the node is operable to re-establish at least one of the one or more control plane sessions with the control plane module of the gateway node.

36. The node of claim 35, wherein the instructions are such that the node is operable to re-establish the at least one of the one or more control plane sessions in response to receiving an indication of the recovery from the failure of the control plane module of the gateway node.

37. The node of claim 35, wherein the instructions are such that the node is operable to send the context information in a control message for re-establishing the at least one of the one or more control plane sessions.

38. The node of claim 34, wherein the instructions are such that the node is operable to, for multicast transmissions which were terminated during the failure of the control plane module of the gateway node, not re-establish the associated control plane session.

39. The node of claim 34, wherein, for each of the one or more control plane sessions, the context information further comprises a tunnel endpoint identifier of the gateway node.

40. The node of claim 34, wherein, for each of the one or more control plane sessions, the context information further comprises a source network address associated with the multicast transmissions.

41. The node of claim 34, wherein, for each of the one or more control plane sessions, the context information further comprises a multicast destination network address associated with the multicast transmissions.

42. A non-transitory computer readable recording medium storing a computer program product for managing multicast transmissions in a cellular network, the computer program product comprising software instructions which, when run on processing circuitry of a gateway node of the cellular network, cause:
a control plane module of the gateway node of the cellular network to establish one or more control plane sessions associated with the multicast transmissions;
a user plane module of the gateway node to establish one or more user plane sessions associated with the multicast transmissions;
the control plane module of the gateway node to indicate context information of each of the one or more control plane sessions to an external storage, wherein, for each of the one or more control plane sessions, the context information comprises a session identifier, and wherein the session identifier of each of the one or more control plane sessions allows distinguishing the context information of the one or more control plane sessions;

the user plane module of the gateway node, during a failure of the control plane module of the gateway node, to maintain the one or more user plane sessions; and the control plane module of the gateway node, after recovery from the failure of the control plane module of the gateway node, to receive the context information from the external storage and re-establish at least one of the one or more control plane sessions based on the received context information.

43. A non-transitory computer readable recording medium storing a computer program product for managing multicast transmissions in a cellular network, the computer program product comprising software instructions which, when run on processing circuitry of a control node of the cellular network, cause the control node to:

establish one or more control plane sessions associated with the multicast transmissions with a control plane module of a gateway node of the cellular network;

receive an indication that a failure of the control plane module of the gateway node occurred while a user plane module remained operative; and in response to the indication, locally clear a context of the one or more control plane sessions, wherein to locally clear the context, the software instructions which, when run on the processing circuitry of the control node of the cellular network, further cause the control node to delete context information of the gateway node that is stored at the control node and release resources of the context information that are provided by the control node, wherein, for each of the one or more control plane sessions, the context information comprises a session identifier, and wherein the session identifier of each of the one or more control plane sessions allows distinguishing the context information of the one or more control plane sessions.

44. A non-transitory computer readable recording medium storing a computer program product for managing multicast transmissions in a cellular network, the computer program product comprising software instructions which, when run on processing circuitry of a node of the cellular network, cause the node to:

receive, from a control plane module of a gateway node of the cellular network, context information of each of one or more control plane sessions associated with the multicast transmissions and established by the control plane module of the gateway node, wherein, for each of the one or more control plane sessions, the context information comprises a session identifier, and wherein the session identifier of each of the one or more control plane sessions allows distinguishing the context information of the one or more control plane sessions;

store the received context information; and after recovery from a failure of the control plane module of the gateway node, send the context information to the control plane module of the gateway node.

* * * * *